United States Patent
Nakamura et al.

(10) Patent No.: US 8,693,156 B2
(45) Date of Patent: *Apr. 8, 2014

(54) PROTECTION APPARATUS FOR LOAD CIRCUIT

(75) Inventors: Yoshihide Nakamura, Shizuoka (JP); Akinori Maruyama, Shizuoka (JP); Keisuke Ueta, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/376,242

(22) PCT Filed: May 19, 2010

(86) PCT No.: PCT/JP2010/058472
§ 371 (c)(1),
(2), (4) Date: Dec. 5, 2011

(87) PCT Pub. No.: WO2010/140474
PCT Pub. Date: Dec. 9, 2010

(65) Prior Publication Data
US 2012/0081825 A1    Apr. 5, 2012

(30) Foreign Application Priority Data
Jun. 4, 2009 (JP) ................. 2009-134793

(51) Int. Cl.
*H02H 5/04* (2006.01)
*H02H 3/20* (2006.01)

(52) U.S. Cl.
USPC ........................................ 361/93.8

(58) Field of Classification Search
USPC ........................................ 361/93.8
See application file for complete search history.

(56) References Cited

U.S. PATENT DOCUMENTS

| 5,623,857 A | 4/1997 | Sakuraba |
| 2003/0123205 A1 | 7/2003 | Ashiya |

(Continued)

FOREIGN PATENT DOCUMENTS

| EP | 0 687 522 A1 | 6/1995 |
| EP | 1 324 452 A2 | 7/2003 |

(Continued)

OTHER PUBLICATIONS

International Search Report dated Aug. 17, 2010 from the International Searching Authority in counterpart application No. PCT/2010/058472.

(Continued)

*Primary Examiner* — Jared Fureman
*Assistant Examiner* — Kevin J Comber
(74) *Attorney, Agent, or Firm* — Sughrue Mion, PLLC

(57) ABSTRACT

A protection apparatus for a load circuit is provided which can miniaturize electric wires and semiconductor switches by using a switch circuit simulating the current interruption time characteristics of fuses. A conductor resistance r and a heat resistance R used in each of a heat generation temperature calculation expression and a heat dissipation temperature calculation expression are respectively changed into a pseudo conductor resistance r* and a pseudo heat resistance R*, then the heat generation amount and the heat dissipation amount of the electric wire are calculated, and current temperature of the electric wire is estimated. When the estimation temperature reaches allowable temperature, an electronic switch S1 is turned off to thereby protect the load circuit. As a result, each of the electric wires and the semiconductor switches used in the load circuit can be protected from over heat.

10 Claims, 22 Drawing Sheets

(56) References Cited

U.S. PATENT DOCUMENTS

| 2003/0202304 | A1  | 10/2003 | Canova et al. |
| 2007/0058303 | A1* | 3/2007  | Hirai et al. ........................ 361/23 |
| 2007/0253132 | A1  | 11/2007 | Nakamura et al. |
| 2008/0285197 | A1* | 11/2008 | Nakamura ................... 361/93.8 |

FOREIGN PATENT DOCUMENTS

| EP | 1 850 438 A2 | 10/2007 |
| JP | 7222345 A | 8/1995 |
| JP | 2001-16880 A | 1/2001 |
| JP | 2003100196 A | 4/2003 |
| JP | 2005-295738 A | 10/2005 |
| JP | 2007-43835 A | 2/2007 |
| JP | 2007295776 A | 11/2007 |
| JP | 2008289297 A | 11/2008 |
| WO | WO2009066564 A1 | 5/2009 |

OTHER PUBLICATIONS

Written Opinion of the International Searching Authority dated Aug. 17, 2010 in counterpart application No. PCT/JP2010/058472.

Information Offer Form dated Nov. 8, 2012 issued by the Japanese Patent Office in counterpart Japanese Patent Application No. 2009-134793.

Observations by a Third party dated May 6, 2013 issued by the European Patent Office in corresponding European Patent Application No. 10783258.6.

Office Action dated Sep. 20, 2013, issued by the Japan Patent Office in corresponding Japanese Application No. 2009-134793.

Office Action dated Oct. 23, 2013, issued by the State Intellectual Property Office of the P.R.C. in corresponding Chinese Application No. 201080024770.X.

\* cited by examiner (a)

(b) ENLARGED DIAGRAM OF PORTION "A"

(a)

(b) ENLARGED DIAGRAM OF PORTION "B"

(a)

s29 ELECTRIC-WIRE TEMPERATURE CHARACTERISTICS
s30 ELECTRIC-WIRE TEMPERATURE 26 [°C]
s31 ELECTRIC-WIRE TEMPERATURE 150 [°C]

(b) ENLARGED DIAGRAM OF PORTION "C"

(c) ENLARGED DIAGRAM OF PORTION "E"

(b)

PROTECTION APPARATUS FOR LOAD CIRCUIT

TECHNICAL FIELD

The present invention relates to a protection apparatus for a load circuit which interrupts the load circuit to thereby protect the circuit in a case where an over-current flows through the load circuit and hence the temperatures of a semiconductor switch and an electric wire increase.

BACKGROUND ART

A load circuit for supplying electric power to loads such as a valve and a motor mounted on a vehicle includes a battery and semiconductor switches (MOSFET etc.) which are provided between the battery and the loads. The battery, the semiconductor switches and the loads are connected via conductors including the electric wires. Further, the load circuit is provided with a control circuit for turning on and off the semiconductor switches, whereby each of the semiconductor switches is turned on and off to thereby switch the operation of the load between a driving state and a stop state in accordance with a driving signal and a stop signal outputted from the control circuit.

Some of such the load circuits are each provided with a fuse for immediately interrupting the circuit to thereby protect a load, electric wires and a semiconductor switch etc. when an over-current flows through the load (see a patent document 1, for example).

FIG. 24 is an explanatory diagram schematically showing a load circuit of the related art. The power supply side terminal of each of loads 101 is connected to a battery VB via an ECU (an electronic control unit for an automobile) 102 and a junk box (J/B) 103.

The ECU 102 is provided with a plurality of semiconductor switches Tr1 such as MOSFETs etc. which are on-off controlled by a control IC 104. A fuse F1 is provided on the upstream side of each of the semiconductor switches Tr1, whereby electric wires W101 on the downstream side are protected by the fuses F1. In other words, electric wires each having a diameter (sectional area) capable of withstanding the interruption current of the fuse F1 are used as the electric wires W101 provided on the downstream side of the fuse F1. Further, the semiconductor switch Tr1 provided on the downstream side of the fuse F1 has the characteristics capable of withstanding the interruption current of the fuse F1.

Similarly, the J/B 103 is provided with fuses F2, whereby electric wires W102 on the downstream side are protected by the fuses F2.

In the case where valves are used as the loads 101, for example, the fuses F1, F2 degrade due to rush currents generated upon the turning-on of the valves and due to the repetition of the turning on/off operations of the valves. Thus, there may arise a case that the fuses F1, F2 are erroneously interrupted due to the aged degradation of the fuses F1, F2. In order to prevent the generation of such the trouble, the fuses are selected in view of margin with respect to a load current. That is, the fuses which interruption current is set to be slightly higher than usual are used. As a result, since it is necessary to use the electric wires and the semiconductor switches each adaptable to the characteristics of the fuse set in view of the margin, it becomes difficult to reduce the diameters of the electric wires and miniaturize the semiconductor switches used in the load circuit.

PRIOR ART DOCUMENT

Patent Document

Patent Document 1: JP-A-2003-100196

SUMMARY OF THE INVENTION

Problems that the Invention is to Solve

In recent years, it has been increasingly demanded to miniaturize the semiconductor switches and the electric wires used in the load circuit as far as possible. On the other hand, as described above, the protection apparatus for the load circuit of the related art is provided with the fuses for interrupting the circuit when the temperature of the electric wires increases due to the generation of an over-current. However, there is a problem that it is difficult to miniaturize the semiconductor switches and reduce the diameters of the electric wires since the fuses are set in view of the margin in order to prevent the erroneous interruption due to the aged degradation.

This invention is made in order to solve such the problem of the related art and an object of the invention is to provide the protection apparatus for a load circuit which can miniaturize semiconductor switches and electric wires.

Means for Solving the Problems

In order to attain the aforesaid object, the first invention is arranged in a manner that in a protection apparatus for a load circuit in which current flowing into an electric wire is detected to thereby turn a semiconductor switch off based on the detected current in the load circuit wherein a power supply, the semiconductor switch and a load are connected via the electric wire, the protection apparatus includes:

a switch unit which is provided between the power supply and the load;

a current detection unit which detects current flowing into the electric wire;

a temperature calculation unit which is provided with a pseudo heat generation temperature calculation expression and a pseudo heat dissipation temperature calculation expression in which a conductor resistance (r) used in a calculation expression for calculating heat generation amount and heat dissipation amount of the electric wire is changed into a pseudo conductor resistance (r*) to which a value simulating current interruption time characteristics of a fuse capable of being used to protect the electric wire used in the load circuit is set and in which a heat resistance (R) used in the calculation expression is changed into a pseudo heat resistance (R*) to which a value simulating the current interruption time characteristics of the fuse is set, the temperature calculation unit estimating temperature of the electric wire by using the pseudo heat generation temperature calculation expression, the pseudo heat dissipation temperature calculation expression and the current detected by the current detection unit;

an over-current determination unit which determines to be over-current when the estimation temperature calculated by the temperature calculation unit reaches allowable temperature; and an interruption control unit which interrupts the switch unit when the over-current determination unit determines to be over-current.

The second invention is arranged in a manner that the interruption control unit places the switch unit in a connectable state when the temperature of the electric wire estimated by the temperature calculation unit reduces to ambient temperature after interrupting the switch unit.

The third invention is arranged in a manner that the pseudo conductor resistance (r*) and the pseudo heat resistance (R*) are set so that the current interruption time characteristics based on the pseudo heat generation temperature calculation expression and the pseudo heat dissipation temperature calculation expression exists between minimum of the current interruption time characteristics of the fuse and maximum of the current interruption time characteristics of the fuse.

The fourth invention is arranged in a manner that the calculation expression for calculating heat generation amount of the electric wire is represented by a following expression (1) and the calculation expression for calculating heat dissipation amount of the electric wire is represented by a following expression (2), where $$T2=T1+I1^2 rR\{1-\exp(-t/C \cdot R)\} \quad (1)$$

$$T2=T1+I2^2 rR\{\exp(-t/C \cdot R)\} \quad (2),$$

and where
T1 represents the ambient temperature [° C.], T2 represents the estimation temperature [° C.] of the electric wire, I1 and I2 each represents a conduction current [A], r represents a conductor resistance [Ω] of the electric wire, R represents a heat resistance [° C./ W], C represents a heat capacity [J/° C.] and t represents a time [sec].

The fifth invention is arranged in a manner that the pseudo conductor resistance (r*) is larger than the conductor resistance (r) of the electric wire and the pseudo heat resistance (R*) is smaller than the heat resistance (R) of the electric wire.

The sixth invention is arranged in a manner that in a protection apparatus for a load circuit in which current flowing into an electric wire is detected to thereby turn a semiconductor switch off based on the detected current in the load circuit wherein a power supply, the semiconductor switch and a load are connected via the electric wire, the protection apparatus includes:

a switch unit which is provided between the power supply and the load;

a current detection unit which detects current flowing into the electric wire;

a temperature calculation unit which is provided with a pseudo heat generation temperature calculation expression and a pseudo heat dissipation temperature calculation expression in which allowable temperature of the electric wire is set to pseudo allowable temperature lower than actual allowable temperature and in which a heat resistance (R) used in a calculation expression for calculating heat generation amount and heat dissipation amount of the electric wire is changed into a pseudo heat resistance (R*) to which a value simulating the current interruption time characteristics of the fuse capable of being used to protect the electric wire used in the load circuit is set, the temperature calculation unit estimating temperature of the electric wire by using the pseudo heat generation temperature calculation expression, the pseudo heat dissipation temperature calculation expression and the current detected by the current detection unit;

an over-current determination unit which determines to be over-current when the estimation temperature calculated by the temperature calculation unit reaches the pseudo allowable temperature; and an interruption control unit which interrupts the switch unit when the over-current determination unit determines to be over-current.

The seventh invention is arranged in a manner that the interruption control unit places the switch unit in a connectable state when the temperature of the electric wire estimated by the temperature calculation unit reduces to ambient temperature after interrupting the switch unit.

The eighth invention is arranged in a manner that the pseudo allowable temperature and the pseudo heat resistance (R*) are set so that the current interruption time characteristics based on the pseudo heat generation temperature calculation expression and the pseudo heat dissipation temperature calculation expression exists between minimum of the current interruption time characteristics of the fuse and maximum of the current interruption time characteristics of the fuse.

The ninth invention is arranged in a manner that the calculation expression for calculating heat generation amount of the electric wire is represented by a following expression (1) and the calculation expression for calculating heat dissipation amount of the electric wire is represented by a following expression (2), where $$T2=T1+I1^2 rR\{1-\exp(-t/C \cdot R)\} \quad (1)$$

$$T2=T1+I2^2 rR\{\exp(-t/C \cdot R)\} \quad (2),$$

and where
T1 represents the ambient temperature [° C.], T2 represents the estimation temperature [° C.] of the electric wire, I1 and I2 each represents a conduction current [A], r represents a conductor resistance [Ω] of the electric wire, R represents a heat resistance [° C./W], C represents a heat capacity [J/° C.] and t represents a time [sec].

The tenth invention is arranged in a manner that the pseudo heat resistance (R*) is smaller than the heat resistance (R) of the electric wire.

Effects of the Invention

According to the first invention, the conductor resistance (r) used in the calculation expression for calculating heat generation amount and heat dissipation amount of the electric wire is changed into the pseudo conductor resistance (r*) and the heat resistance (R) used in the calculation expression is changed into the pseudo heat resistance (R*) to thereby obtain the pseudo heat generation temperature calculation expression and the pseudo heat dissipation temperature calculation expression. The temperature calculation unit estimates temperature of the electric wire by using the pseudo heat generation temperature calculation expression and the pseudo heat dissipation temperature calculation expression. Then, when the estimation temperature reaches the allowable temperature, the switch unit is interrupted to thereby stop the supply of current to the load circuit. Since the current interruption time characteristics of the electric wire can be made close to the current interruption time characteristics of the fuse by using the pseudo conductor resistance (r*) and the pseudo heat resistance (R*), the load circuit can be interrupted with the characteristics same as that of the fuse, each of the electric wires and the semiconductor switches used in the load circuit can be surely protected from overheat.

Further, unlike the related art, since there is no fear that the fuse degrades due to the rush current and the repetition of the turning on/off operations of the load, it is not necessary to consider margin with respect to the interruption temperature, so that the diameter of the electric wire can be made small. Thus, since the electric wires can be miniaturized and light-weighted, the fuel cost can be improved.

According to the second invention, in the case where the switch mans is turned off due to over-current, since the turned-off state of the switch unit is kept until the temperature of the electric wire thereafter reduces to the ambient temperature. Thus, since the switch unit can be prevented from being turned on again in a state that the generation reason of the over-current has not been investigated yet, the electric wire can be protected from the generated heat.

According to the third invention, the pseudo conductor resistance (r*) and the pseudo heat resistance (R*) are selected suitably so that the current interruption time characteristics of the electric wire is set between the minimum of the current interruption time characteristics of the fuse and the maximum of the current interruption time characteristics of the fuse. Thus, the load circuit simulating the characteristics of the fuse can be protected.

According to the fourth invention, the conductor resistance (r) and the heat resistance (R) of the aforesaid expressions (1) and (2) are changed into the pseudo conductor resistance (r*) and the pseudo heat resistance (R*), respectively, to thereby obtain the pseudo heat generation temperature calculation expression and the pseudo heat dissipation temperature calculation expression. Since these expressions (1) and (2) are general expressions used normally, the estimation temperature can be calculated easily by merely changing parameter(s).

According to the fifth invention, the pseudo conductor resistance (r*) is set to be larger than the actual conductor resistance (r) and the pseudo heat resistance (R*) is set to be smaller than the actual heat resistance (R) to thereby obtain the pseudo heat generation temperature calculation expression and the pseudo heat dissipation temperature calculation expression. Thus, the current interruption time characteristics of the electric wire can be made surely close to the current interruption time characteristics of the fuse.

According to the sixth invention, the allowable temperature of the electric wire is set to the pseudo allowable temperature, and the heat resistance (R) used in the calculation expression for calculating heat generation amount and heat dissipation amount of the electric wire is changed into the pseudo heat resistance (R*) to thereby obtain the pseudo heat generation temperature calculation expression and the pseudo heat dissipation temperature calculation expression. The temperature calculation unit estimates temperature of the electric wire by using the pseudo heat generation temperature calculation expression and the pseudo heat dissipation temperature calculation expression. Then, when the estimation temperature reaches the allowable temperature, the switch unit is interrupted to thereby stop the supply of current to the load circuit. Since the current interruption time characteristics of the electric wire can be made close to the current interruption time characteristics of the fuse by using the pseudo allowable temperature and the pseudo heat resistance (R*), the load circuit can be interrupted with the characteristics same as that of the fuse, each of the electric wires and the semiconductor switches used in the load circuit can be surely protected from overheat.

Further, unlike the related art, since there is no fear that the fuse degrades due to the rush current and the repetition of the turning on/off operations of the load, it is not necessary to consider margin with respect to the interruption temperature, so that the diameter of the electric wire can be made small. Thus, since the electric wires can be miniaturized and light-weighted, the fuel cost can be improved.

According to the seventh invention, in the case where the switch mans is turned off due to over-current, since the turned-off state of the switch unit is kept until the temperature of the electric wire thereafter reduces to the ambient temperature. Thus, since the switch unit can be prevented from being turned on again in a state that the generation reason of the over-current has not been investigated yet, the electric wire can be protected from the generated heat.

According to the eighth invention, the pseudo allowable temperature and the pseudo heat resistance (R*) are selected suitably so that the current interruption time characteristics of the electric wire is set between the minimum of the current interruption time characteristics of the fuse and the maximum of the current·interruption time characteristics of the fuse. Thus, the load circuit simulating the characteristics of the fuse can be protected.

According to the ninth invention, the heat resistance (R) of the aforesaid expressions (1) and (2) is changed into the pseudo heat resistance (R*) and the allowable temperature of the electric wire is changed into the pseudo allowable temperature to thereby obtain the pseudo heat generation temperature calculation expression and the pseudo heat dissipation temperature calculation expression. Since these expressions (1) and (2) are general expressions used normally, the estimation temperature can be calculated easily by merely changing parameter(s).

According to the tenth invention, the pseudo heat resistance (R*) is set to be smaller than the actual heat resistance (R) to thereby obtain the pseudo heat generation temperature calculation expression and the pseudo heat dissipation temperature calculation expression. Thus, the current interruption time characteristics of the electric wire can be made surely close to the current interruption time characteristics of the fuse.

BRIEF DESCRIPTION OF THE DRAWINGS

FIG. 18(a) is a characteristic diagram showing the change of the temperature of the electric wire in a case where the temperature of the electric wire saturates at a constant current (40 [A]) and thereafter the current is interrupted and heat is dissipated.

FIG. 18(a) is a characteristic diagram showing the change of the temperature of the electric wire in a case where the temperature of the electric wire increases with a constant current (40 [A]) and the current is interrupted to thereby dissipate heat in a transient state before the electric wire temperature reaches saturation temperature T40max.

FIG. 20(a) is a characteristic diagram showing the change of the temperature of the electric wire in a case where the temperature of the electric wire reaches saturation temperature due to a first current (for example, 30 [A]) and further the temperature of the electric wire reaches saturation temperature according to a second current (for example, 40 [A]) larger than the first current.

FIG. 21(a) is a characteristic diagram showing the change of the temperature of the electric wire in a case where the temperature of the electric wire increases due to a first current (for example, 30 [A]), then the current is changed into a second current (for example, 40 [A]) larger than the first current before the temperature reaches saturation temperature T30max according to the first current and the temperature reaches saturation temperature T40max according to the second current.

FIG. 22(a) is a characteristic diagram showing the change of the temperature of the electric wire in a case where the temperature of the electric wire reaches saturation temperature T40max of a first current due to the first current (for example, 40 [A]) and further the temperature of the electric wire reduces to saturation temperature T30max of a second current according to the second current (for example, 30 [A]) smaller than the first current.

FIG. 23(a) is a characteristic diagram showing the change of the temperature of the electric wire in a case where a first current is changed into a second current (for example, 30 [A]) smaller than the first current when the temperature of the electric wire increases according to the first current (for example, 40 [A]) and the temperature reaches Tx before reaching saturation temperature T40max of the first current, then the electric wire temperature reduces and reaches saturation temperature T30max of the second current.

MODES FOR CARRYING OUT THE INVENTION

[Explanation of First Embodiment]

Figure 1:
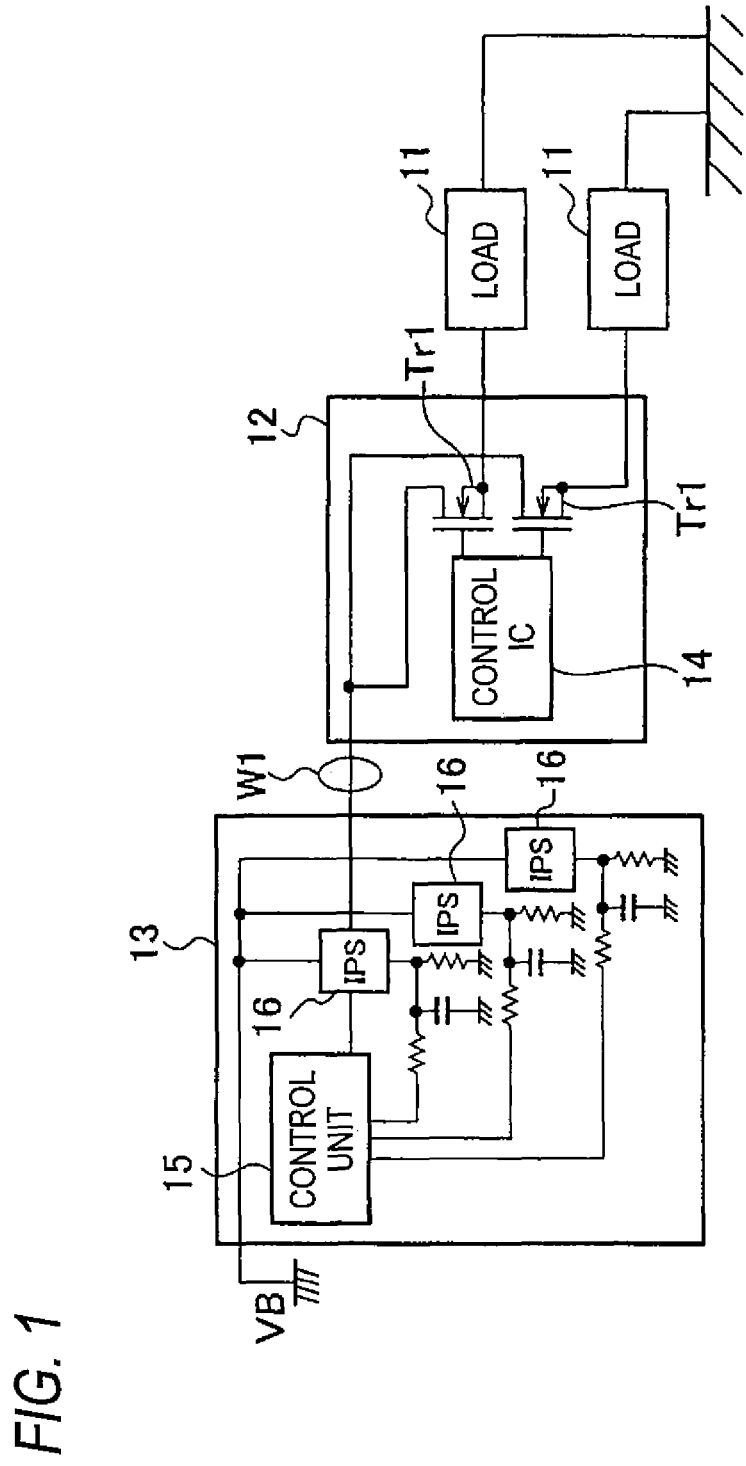
FIG. 1 is a circuit diagram showing the configuration of a protection apparatus for a load circuit according to an embodiment of the invention.

Hereinafter, embodiments according to the invention will be explained based on drawings. FIG. 1 is a circuit diagram showing the configuration of a load circuit to which a protection apparatus according to a first embodiment of the invention is applied.

The load circuit is a circuit which supplies electric power outputted from a battery VB (power supply) to loads 11 such as a valve and a motor etc. mounted on a vehicle to thereby control the driving and stop of the respective loads 11. The load circuit includes an ECU (an electronic control unit for an automobile) 12 and a junk box (J/B) 13.

The ECU 102 is provided with a plurality of semiconductor switches Tr1 such as MOSFETs etc. One terminal of each of the semiconductor switches Tr1 is connected to the load 11 and the other terminal thereof is connected to the J/B 13 via an electric wire W1. The ECU 102 includes a control IC 14. The control IC 14 controls the on/off states of each of the semiconductor switches Tr1 to thereby control the driving and stop operations of the loads 11.

The J/B 13 includes a plurality of switch circuits 16 (shown by "IPS" in the figure) for connecting between the electric wires W1 and the battery VB. The switch circuits 16 are operated under the control of a control unit 15.

Figure 2:
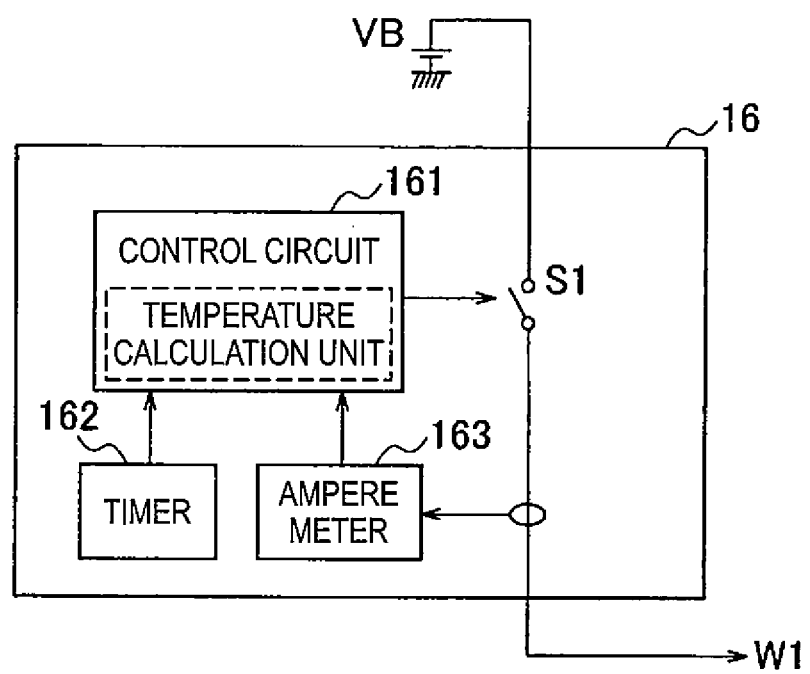
FIG. 2 is a block diagram showing the detailed configuration of the switch circuit of the protection apparatus for a load circuit according to the embodiment of the invention.

FIG. 2 is a block diagram showing the detailed configuration of the switch circuit 16. As shown in FIG. 2, the switch circuit 16 includes an electronic switch S1 (a switch unit), an ampere meter (a current detection unit) 163 for detecting current flowing through the electric wire W1, a timer 162 for counting a lapsed time during which the current flows, and a control circuit 161 for controlling the on/off state of the electronic switch S1 based on the time counted by the timer 162. The control circuit 161 has functions as a temperature calculation unit, an interruption control unit and an over-current determination unit.

In the protection apparatus for the load circuit according to the first embodiment, the control circuit 161 estimates the virtual temperature (not the actual temperature of the electric wire W1 but the virtual temperature of the electric wire W1 defined by a pseudo arithmetic expression) of the electric wire W1 by using a temperature calculation method described later and turns off the electronic switch S1 to thereby interrupt the upstream side of the electric wire W1 when the virtual temperature reaches an allowable temperature (for example, 150° C.) set in advance.

The temperature of the electric wire at the time of heat generation and the temperature of the electric wire at the time of heat dissipation are known as being expressed by the following expressions (1) and (2), respectively.

$$T2 = T1 + I1^2 rR\{1 - \exp(-T/C \cdot R)\} \quad (1)$$

$$T2 = T1 + I2^2 rR\{\exp(-T/C \cdot R)\} \quad (2)$$

In the expressions (1) and (2), T1 represents an ambient temperature [° C.], T2 represents the estimation temperature [° C.] of the electric wire, I1 represents a conduction current [A], r represents a conductor resistance [Ω] of the electric wire, R represents a heat resistance [° C./W], C represents a heat capacity [J/° C.] and t represents a time [sec]. Further, I2 represents an estimation current which acts, when the electric wire is changed to the heat dissipation state from the heat generation state, to set a difference temperature Tc to a saturation temperature in a case where the difference temperature Tc(=Ta−Tb) is obtained based on the temperature Ta of the electric wire just before the change and the saturation temperature Tb according to the detection current after the change. Detailed explanation will be made with reference to patterns 1 to 6 described later.

Thus, the estimation temperature T2 of the electric wire W1 at the time of the heat generation can be obtained by inserting the ambient temperature T1, the current I1 and the time t into the expression (1), and the estimation temperature T2 of the electric wire W1 at the time of the heat dissipation can be obtained by inserting the ambient temperature T1, the current I2 and the time t into the expression (2).

As the ambient temperature T1, it is possible to employ a method of inserting the ambient temperature based on environment where the circuit is provided or a method of disposing a thermometer (not shown) and inserting temperature detected by the thermometer, for example Hereinafter, the explanation will be made as to the temperature calculation method employed in the first embodiment. This temperature calculation method calculates the estimation temperature by using a pseudo conductor resistance and a pseudo heat resistance.

[Temperature Calculation Using Pseudo Conductor Resistance]

In the aforesaid expressions (1) and (2), when the conductor resistance r of the electric wire is changed to a value larger than the actual value thereof, a time required for the estimation temperature T2 to reach the saturation temperature becomes shorter. The explanation will be made in detail.

Figure 3:
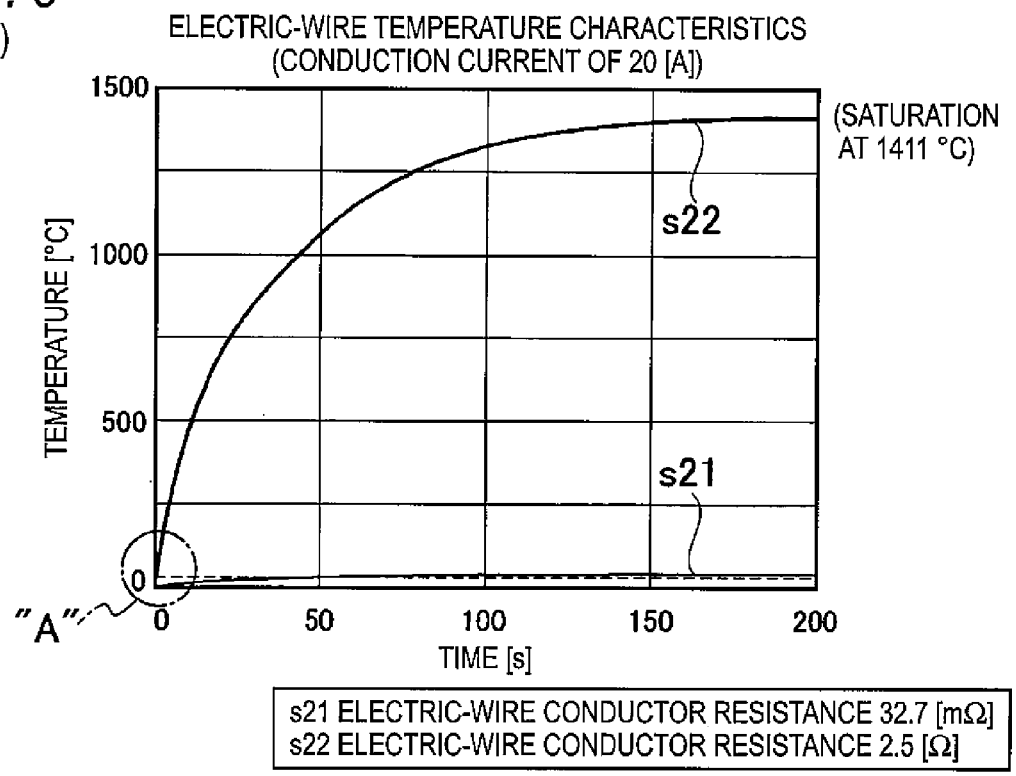
FIG. 3(a) relates to the protection apparatus for a load circuit according to the first embodiment of the invention and is an explanatory diagram showing the characteristics of electric-wire temperature in a case where conductor resistance of the electric wire is changed and current of 20 [A] is flown.
FIG. 3(b) is an enlarged diagram of a portion "A" shown in FIG. 3(a).
Figure 3:
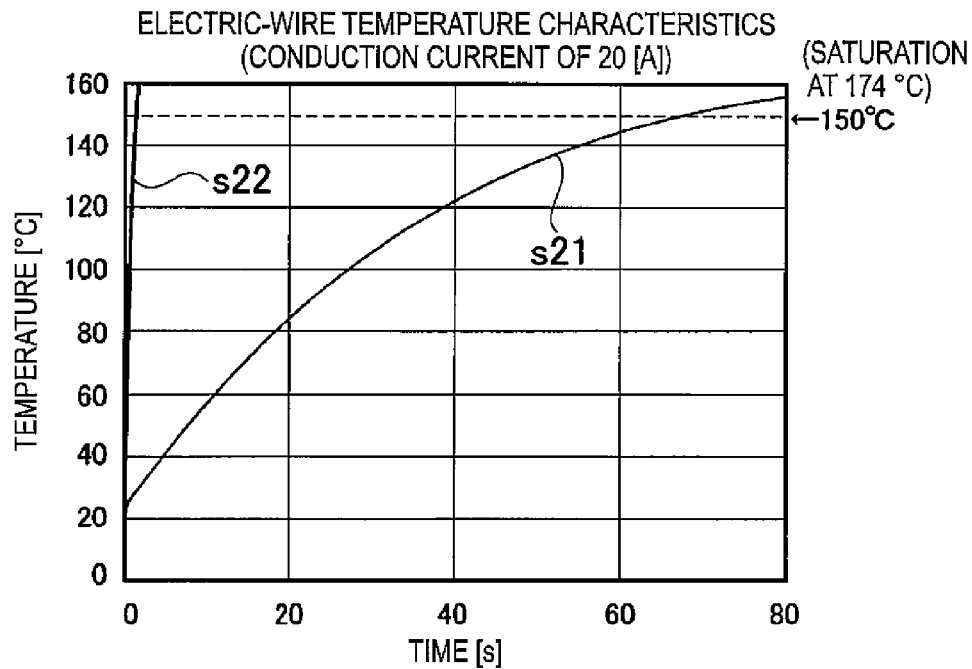

FIG. 3 is a characteristic diagram showing the change of the temperature of the electric wire in a case where the electric wire with the allowable temperature of 150° C. (hereinafter called a sample electric wire) is used and current of 20 [A] (small over-current) is flown continuously into the sample electric wire, in which (b) is an enlarged diagram of a portion "A" shown in (a). Further, a curve s21 shown in FIG. 3 is a characteristic curve in a case where the conductor resistance r shown in the expression (1) is set to the actual conductor resistance r=32.7 [mΩ] of the sample electric wire, and a curve s22 is a characteristic curve in a case where the conductor resistance r shown in the expression (1) is set to the pseudo conductor resistance r*=2.5 [mΩ] (that is, r*>r).

As shown by the curve s21, when the current of 20 [A] is flown through the sample electric wire, the temperature of the electric wire exceeds 150° C. and saturates at 174° C. In contrast, as shown by the curve s22, when the conductor resistance r is changed into the pseudo conductor resistance r* and the current of 20 [A] is flown through the sample electric wire, the temperature of the electric wire saturates at 1411° C.

As understood from FIG. 3(b), when the conductor resistance r is set to the actual value of 32.7 [mΩ], the temperature reaches the allowable temperature of 150° C. with a time lapse of about 68 [sec]. Also, when the conductor resistance r is changed into the pseudo conductor resistance r*, the temperature reaches the allowable temperature of 150° C. with a time lapse of about 0.75 [sec]. Accordingly, in the case of continuously flowing the current of 20 [A] through the sample electric wire, the temperature can reach the allowable temperature of 150° C. at an earlier time point by chanting the conductor resistance r into the pseudo conductor resistance r*.

Figure 4:
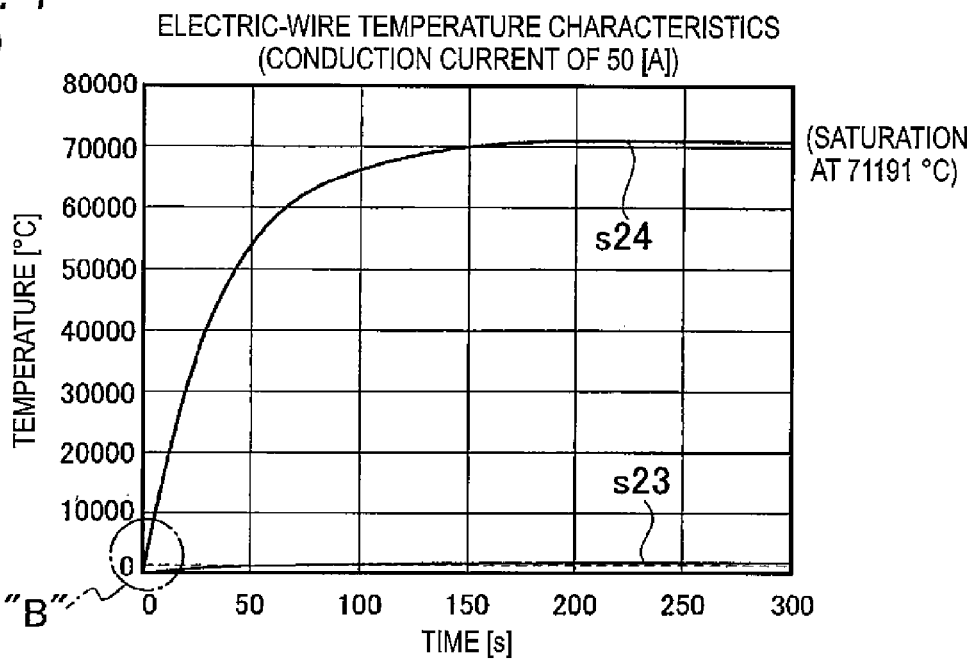
FIG. 4(a) relates to the protection apparatus for a load circuit according to the first embodiment of the invention and is an explanatory diagram showing the characteristics of electric-wire temperature in a case where conductor resistance of the electric wire is changed and current of 50 [A] is flown.
FIG. 4(b) is an enlarged diagram of a portion "B" shown in FIG. 4(a).
Figure 4:
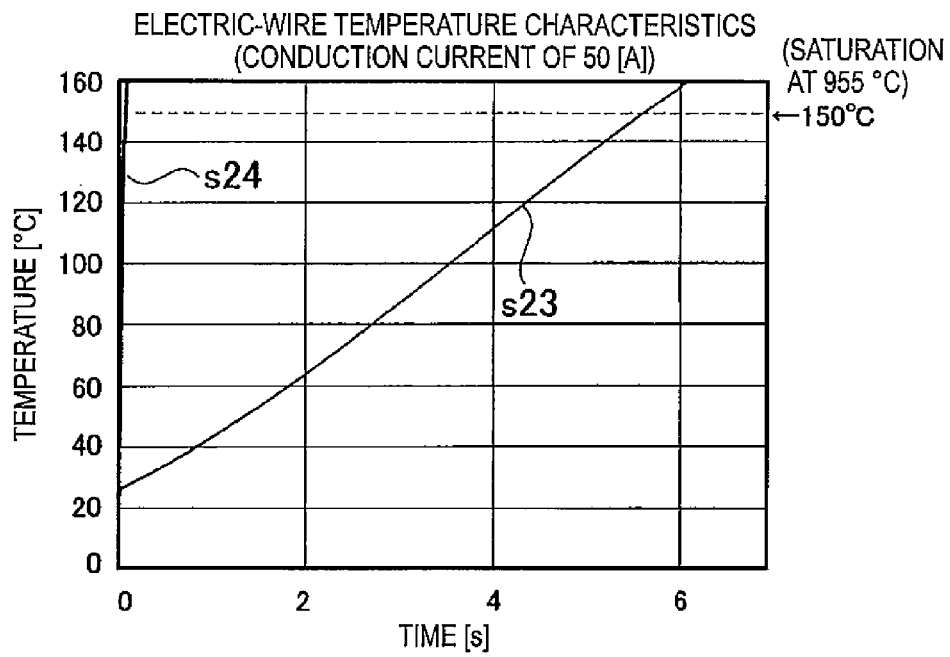

FIG. 4 is a characteristic diagram showing the change of the temperature of the electric wire in a case where current of 50 [A] (large over-current) is flown continuously into the sample electric wire, in which (b) is an enlarged diagram of a portion "B" shown in (a). Further, a curve s23 shown in FIG. 4 is a characteristic curve in a case where the conductor resistance r shown in the expression (1) is set to the actual conductor resistance r=32.7 [mΩ] of the sample electric wire, and a curve s24 is a characteristic curve in a case where the conductor resistance r shown in the expression (1) is set to the pseudo conductor resistance r*=2.5 [mΩ] (that is, r*>r).

As shown by the curve s23, when the current of 50 [A] is flown through the sample electric wire, the temperature of the electric wire exceeds 150° C. and saturates at 955° C. In contrast, as shown by the curve s24, when the conductor resistance r is changed into the pseudo conductor resistance r* and the current of 50 [A] is flown through the sample electric wire, the temperature of the electric wire saturates at 71191° C.

As understood from FIG. 4(b), when the conductor resistance r is set to the actual value of 32.7 [mΩ], the temperature reaches the allowable temperature of 150° C. with a time lapse of about 5.5 [sec]. Also, when the conductor resistance r is changed into the pseudo conductor resistance r*, the temperature reaches the allowable temperature of 150° C. with a time lapse of about 0.04 [sec]. Accordingly, like the aforesaid case of 20 [A], in the case of continuously flowing the current of 50 [A] through the sample electric wire, the temperature can reach the allowable temperature of 150° C. at an earlier time point by using the pseudo conductor resistance r*.

As described above, the time required for the temperature of the electric wire to reach the saturation temperature becomes shorter by changing the conductor resistance r into the pseudo conductor resistance r*. Further, the time required for the temperature of the electric wire to reach the allowable temperature becomes also shorter.

[Temperature Calculation Method Using Pseudo Heat Resistance]

In the aforesaid expressions (1) and (2), the saturation temperature of the electric wire can be reduced when the heat resistance R of the electric wire is changed into a value smaller than the actual value thereof. The explanation will be made in detail.

Figure 5:
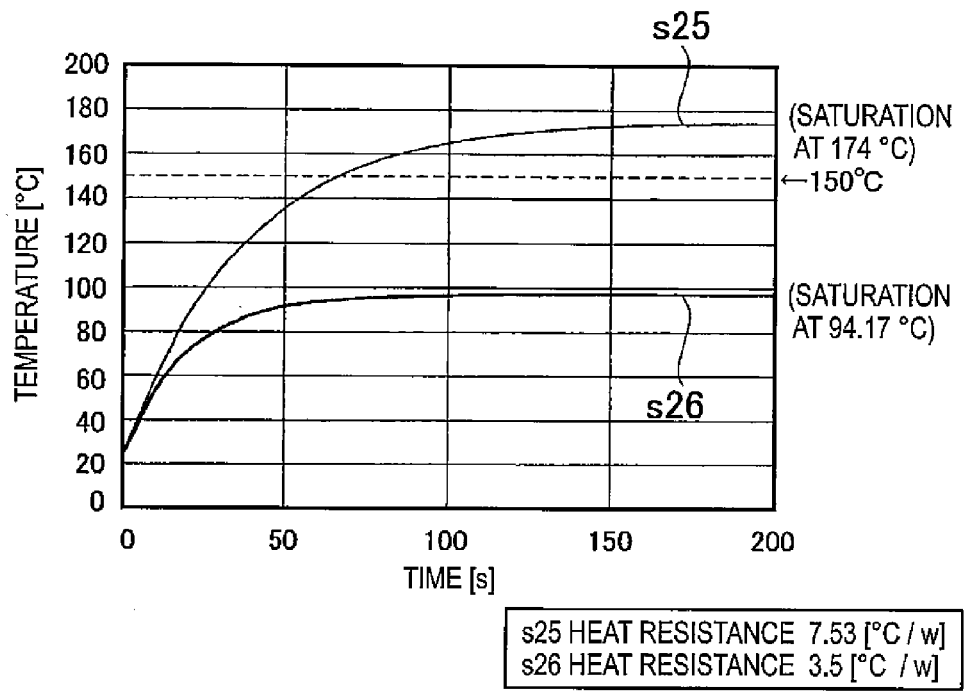
FIG. 5 relates to the protection apparatus for a load circuit according to the first and second embodiments of the invention and is an explanatory diagram showing the characteristics of electric-wire temperature in a case where heat resistance of the electric wire is changed and current of 20 [A] is flown.

FIG. 5 is a characteristic diagram showing the change of the temperature of the electric wire in a case where current of 20 [A] (small over-current) is flown continuously into the sample electric wire, in which a curve s25 is a characteristic curve in a case where the heat resistance R shown in the expression (1) is set to the actual heat resistance R=7.53 [° C./W] of the sample electric wire, and a curve s26 is a characteristic curve in a case where the heat resistance R shown in the expression (1) is set to the pseudo heat resistance R*=3.5 [° C./W] (that is, R*<R).

As shown by the curve s25, when the current of 20 [A] is flown through the sample electric wire, the temperature of the electric wire exceeds 150° C. and saturates at 174° C. In contrast, as shown by the curve s26, when the heat resistance R is changed into the pseudo heat resistance R* and the current of 20 [A] is flown through the sample electric wire, the temperature of the electric wire saturates at 94.17° C. and does not reach 150° C.

As understood from the aforesaid matter, in the case where current of 20 [A] is flown continuously into the sample electric wire, the saturation temperature of the electric wire can be reduced by changing the heat resistance R into the pseudo heat resistance R*.

Figure 6:
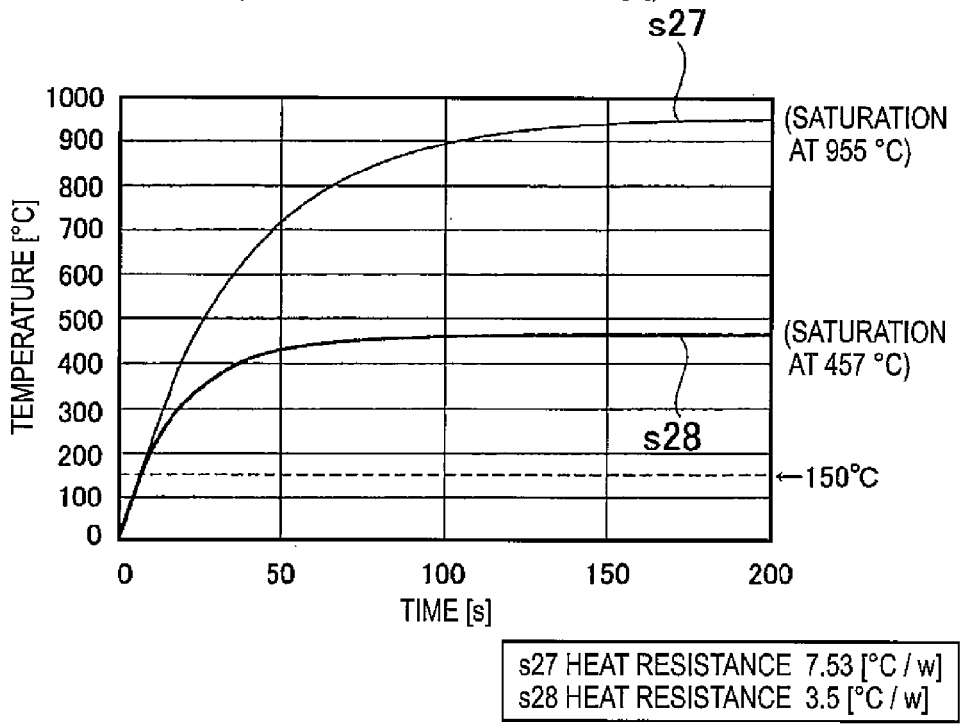
FIG. 6 relates to the protection apparatus for a load circuit according to the first and second embodiments of the invention and is an explanatory diagram showing the characteristics of electric-wire temperature in a case where heat resistance of the electric wire is changed and current of 50 [A] is flown.

FIG. 6 is a characteristic diagram showing the change of the temperature of the electric wire in a case where current of 50 [A] (large over-current) is flown continuously into the sample electric wire, in which a curve s27 is a characteristic curve in a case where the heat resistance R shown in the expression (1) is set to the actual heat resistance R=7.53 [° C./W] of the sample electric wire, and a curve s28 is a characteristic curve in a case where the heat resistance R shown in the expression (1) is set to the pseudo heat resistance R*=3.5 [° C./W] (that is, R*<R).

As shown by the curve s27, when the current of 20 [A] is flown through the sample electric wire, the temperature of the electric wire exceeds 150° C. and saturates at 955° C. In contrast, as shown by the curve s28, when the heat resistance R is changed into the pseudo heat resistance R* and the current of 50 [A] is flown through the sample electric wire, the temperature of the electric wire saturates at 457° C.

As understood from the aforesaid matter, in the case where current of 50 [A] is flown continuously into the sample electric wire, like the aforesaid case of 20 [A], the saturation temperature of the electric wire can be reduced by changing the heat resistance R into the pseudo heat resistance R*.

When summarizing the aforesaid contents, a time required for the temperature of the electric wire to reach the saturation temperature can be shortened by changing the conductor resistance r used in the expressions (1) and (2) into the pseudo conductor resistance r*, whereby a time required to reach the allowable temperature can be shortened. Further, the saturation temperature of the electric wire can be reduced by changing the heat resistance R into the pseudo heat resistance R*.

In this embodiment, the following expressions (1a) and (2a) are set in which the conductor resistance r and the heat resistance R used in the expressions (1) and (2) are respectively changed into the pseudo conductor resistance r* and the pseudo heat resistance R*.

$$T2 = T1 + I1^2 \cdot (r^*) \cdot (R^*) \cdot \{1 - \exp(-t/C \cdot R)\} \quad (1a)$$

$$T2 = T1 + I2^2 \cdot (r^*) \cdot (R^*) \cdot \{\exp(-t/C \cdot R)\} \quad (2a)$$

($r^*$=2.5 [Ω], $R^*$=0.3 [° C./W])

In the expressions (1a) and (2a), T1 represents an ambient temperature [° C.], T2 represents the estimation temperature [° C.] of the electric wire, I1 represents a conduction current [A], r* represents the pseudo conductor resistance [Ω], R represents the pseudo heat resistance [° C./W], C represents a heat capacity [J/° C.] and t represents a time [sec]. Further, I2 represents an estimation current.

Hereinafter, the explanation will be made as to a procedure for setting the pseudo conductor resistance r* and the pseudo heat resistance R* used in the aforesaid expressions (1a) and (2a) with reference to characteristic diagrams shown in FIGS. 9 to 13. In each of FIGS. 9 to 13 and FIGS. 14 to 16 used in a second embodiment described later, an ordinate (time axis) is scaled logarithmically.

Figure 9:
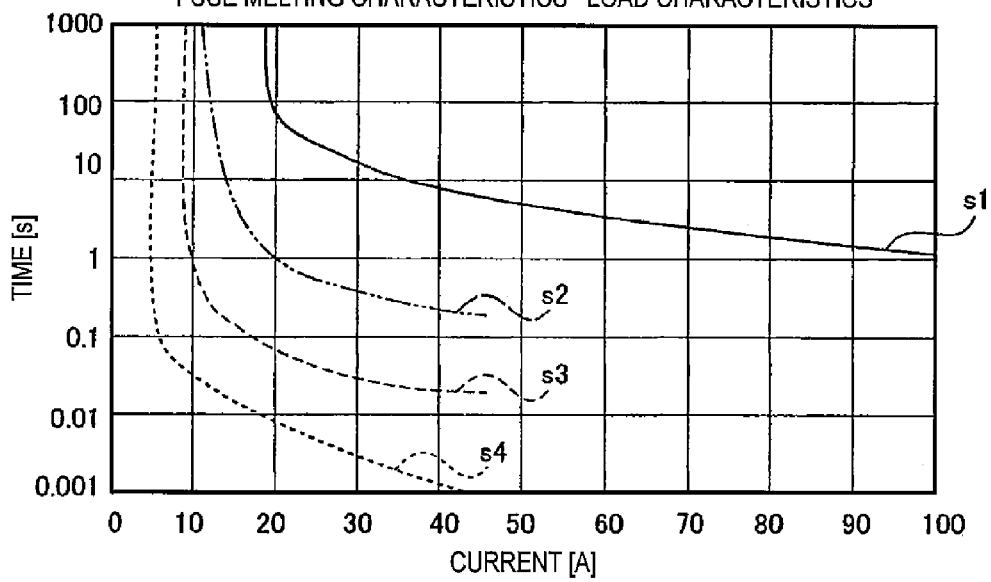
FIG. 9 is an explanatory diagram showing current interruption time characteristics of the protection apparatus for a load circuit according to the first embodiment of the invention.

A curve s1 shown in FIG. 9 is a characteristic diagram showing current·interruption time characteristics at the time of setting the allowable temperature to 150° C. That is, the curve s1 represents the relation between the current I1 and the lapsed time t [sec] of the right side of the expression (1) when T2 of the left side of this expression is fixed to 150° C. As will be understood from the curve s1, this curve represents that, in a case where the allowable temperature of the electric wire (temperature at which smoke is emitted due to over heat) is 150° C., although the temperature of the electric wire does not reach 150° C. when current of 20 [A] flows for ten seconds, for example, the temperature of the electric wire reach 150° C. when current of 90 [A] flows for ten seconds. In other words, the temperature of the electric wire does not reach the allowable temperature of 150° C. so long as the operation is performed with currents inside of the curve s1 (left lower side in the figure).

Each of curves s2 and s3 is a characteristic curve showing the current interruption time of the fuse of general standard which is provided on the upstream side of the electric wire which allowable temperature is set to 150° C., in which the curve s2 and the curve s3 show the maximum values (MAX) and the minimum values (MIN), respectively. That is, this fuse interrupts current to protect the circuit when the current in a region between the curves s2 and s3 flows. Thus, the circuit can be surely interrupted before a time point where the temperature of the electric wire reaches 150° C. by using this fuse. As a result, when each of the switch circuits 16 shown in FIGS. 1 and 2 is configured to include the current interruption time characteristics between the curves s2 and s3, the characteristics of the fuse having been used conventionally can be simulated.

A curve s4 represents load characteristics. Since the characteristics represented by the curve s4 operates at the inner side (left lower side) than curves s2 and s3 representing the current interruption time characteristics of the fuse, the fuse can not be interrupted by the current flowing into the load during the normal operation.

Figure 10:
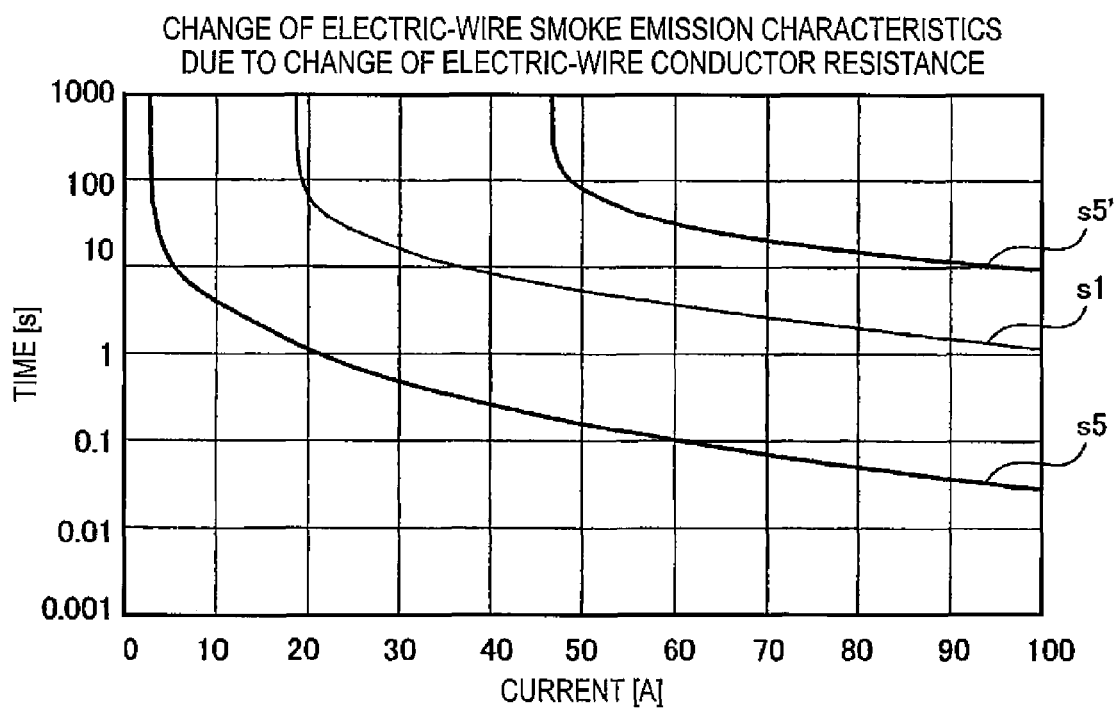
FIG. 10 is an explanatory diagram showing current interruption time characteristics of the protection apparatus for a load circuit according to the first embodiment of the invention.

FIG. 10 is a diagram showing current interruption time characteristics at the time of changing the conductor resistance r (for example, 32.7 [mΩ]) of the electric wire having the allowable temperature of 150° C., in which a curve s5 represents a case where the conductor resistance is changed into the pseudo conductor resistance r*=1 [Ω] and a curve s5' represents a case where the conductor resistance is changed into the pseudo conductor resistance r*=5 [mΩ]. As will be understood from the curves s5 and s5', the current interruption time characteristic curve shifts to the left lower side in FIG. 10 when the pseudo conductor resistance r* larger than the actual conductor resistance r is used, whilst the current interruption time characteristic curve shifts to the right upper side in FIG. 10 when the pseudo conductor resistance r* smaller than the actual conductor resistance r is used.

Figure 11:
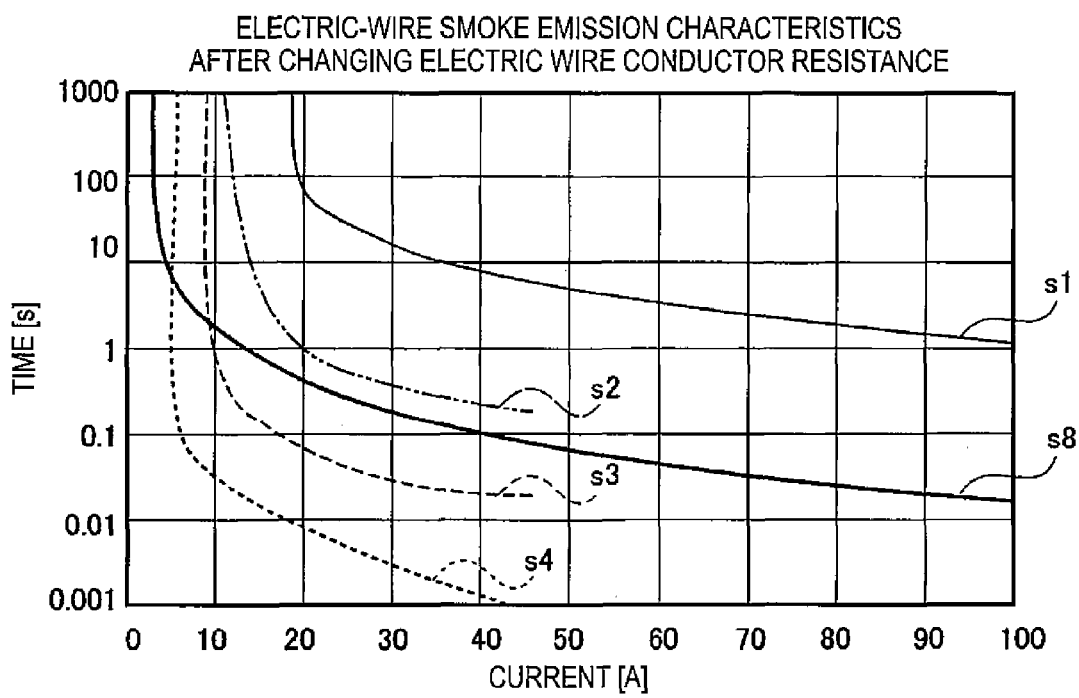
FIG. 11 is an explanatory diagram showing current interruption time characteristics of the protection apparatus for a load circuit according to the first embodiment of the invention.

Thus, when the resistance is set to the pseudo conductor resistance r*=2.5 [Ω] with respect to the curve s1 (conductor resistance r=32.7 mΩ, for example) shown in FIG. 9, a curve shown by a curve s8 in FIG. 11 is obtained.

As shown in FIG. 11, in a region where the current exceeds 10 [A], the curve s8 has characteristics existing between the curve s2 and the curve s3. However, in a region where the current is equal to or lower than 10 [A], the curve s8 shifts largely to the left side than the curve s3 and further shifts to the left side than the load characteristics curve s4. This unit that in the case of using the current·interruption time characteristic curve shown by the curve s8, the load circuit is interrupted when normal current flows into the load.

Figure 12:
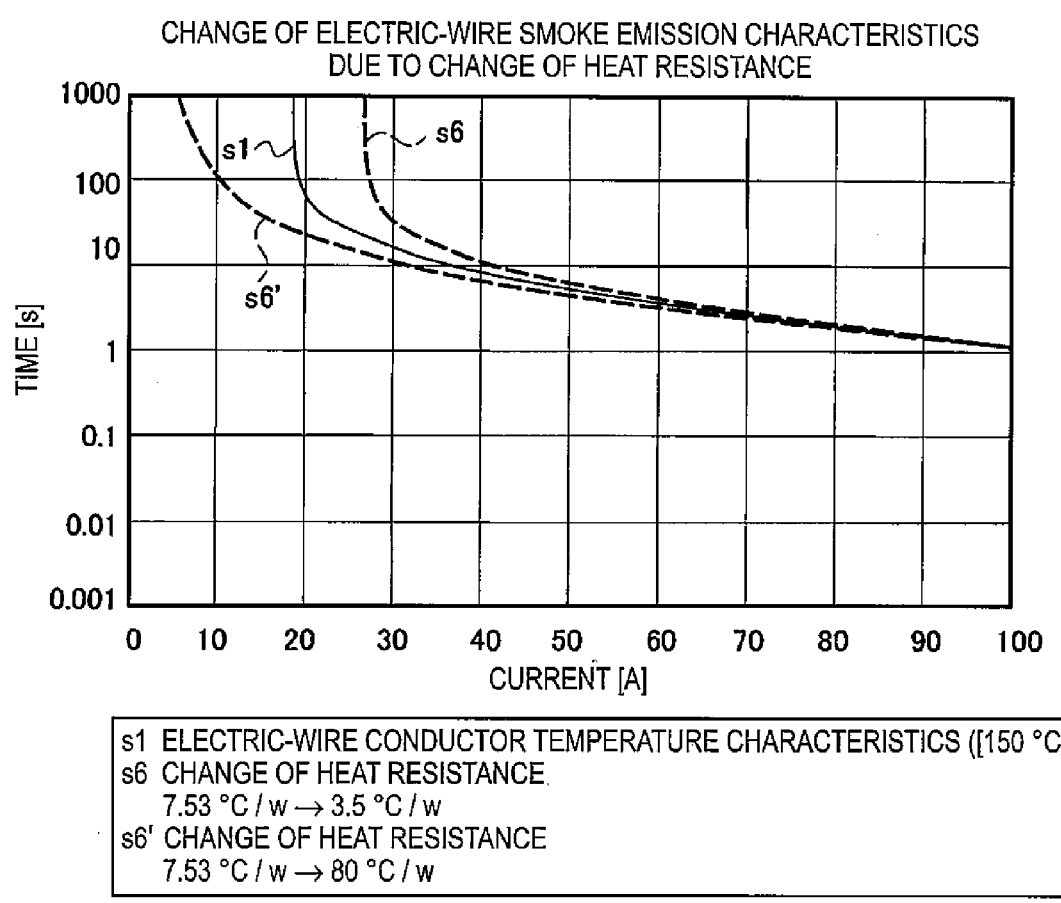
FIG. 12 is an explanatory diagram showing current interruption time characteristics of the protection apparatus for a load circuit according to the first embodiment of the invention.

FIG. 12 is a diagram showing the electric-wire smoke emission characteristics at the time of changing the heat resistance R (for example, 7.53 [° C./W]) of the electric wire having the allowable temperature of 150° C., in which a curve s6 represents a case where the resistance is changed into the pseudo heat resistance R*=3.5 [° C./W] and a curve s6' represents a case where the resistance is changed into the pseudo heat resistance R*=80 [° C./W]. As will be understood from the curves s6 and s6', the value of the left end of the current·interruption time characteristic curve shifts to the right side in FIG. 12 when the pseudo heat resistance R* smaller than the actual heat resistance R is used, whilst the value of the left end of the current interruption time characteristic curve shifts to the left side in FIG. 12 when the pseudo heat resistance R* larger than the actual heat resistance R is used.

Figure 13:
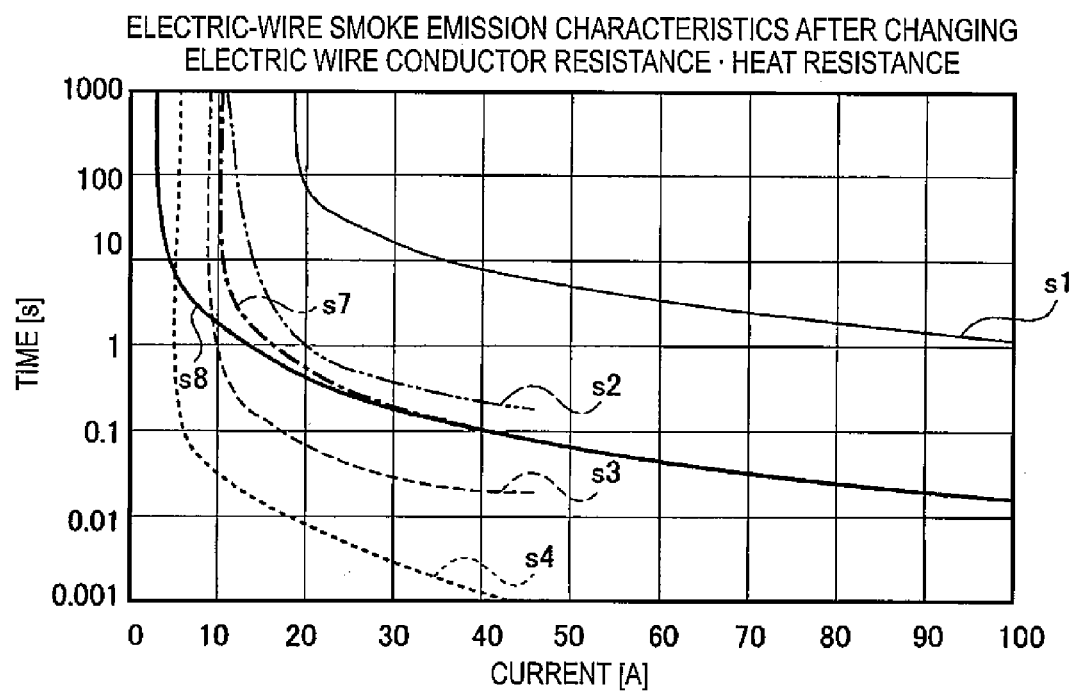
FIG. 13 is an explanatory diagram showing current interruption time characteristics of the protection apparatus for a load circuit according to the first embodiment of the invention.

Thus, when the pseudo heat resistance R* is further changed into 0.3 [° C./W] (that is, R*<R=7.53 [° C./W]) in the characteristics represented by the current interruption time characteristic curve s8 obtained by changing the pseudo conductor resistance r* into 2.5 [Ω], a characteristic curve can be obtained as shown by the characteristic curve s7 in FIG. 13 in which the minimum current of the characteristic curve s8 is shifted to the right side. Since the characteristic curve s7 has the characteristics between the characteristic curve s2 and the characteristic curve s3, this characteristic curve has the current·interruption time characteristics simulating the fuse.

In view of the aforesaid matter, the aforesaid expressions (1a) and (2a) are set in a manner that the conductor resistance r and the heat resistance R used in the expressions (1) and (2) are respectively changed into the pseudo conductor resistance r* (for example, r*=2.5 [Ω]) and the pseudo heat resistance R* (for example, R*=0.3 [° C./W]), and the temperature of the electric wire is estimated by using these expressions (1a) and (2a). Then, the characteristics almost same as that of the fuse of the related art can be obtained if the electronic switch S1 (see FIG. 2) is turned off at a time where the estimated temperature of the electric wire reaches the allowable temperature (for example, 150° C.). Of course, the estimation temperature in this case is not the actual temperature of the electric wire but a pseudo temperature determined by the aforesaid temperature calculation method.

Next, the explanation will be made as to six patterns concerning the calculation procedure of the temperature of the electric wire at the time of heat generation according to the expression (1) and the calculation procedure of the temperature of the electric wire at the time of heat dissipation according to the expression (2), that is, patterns 1 to 6 shown in FIGS. 18 to 23.

[Pattern 1]

FIG. 18(a) is a characteristic diagram showing the change of the temperature of the electric wire in a case where the temperature of the electric wire saturates at a constant current (40 [A]) and thereafter the current is interrupted and heat is dissipated. FIG. 18(b) is an explanatory diagram showing status changes. When current of 40 [A] flows into the electric wire in a state where initial temperature is ambient temperature of T0 (state P1), the temperature of the electric wire increases gradually from the temperature T0 (state P2) and then the temperature reaches the saturation temperature T40max of the current 40 [A] at a time point tx=t1. That is, when T0 is inserted into the ambient temperature T1, 40 [A] is inserted into the current I1 and t1 is inserted into the time t of the right side of the expression (1), the estimation temperature T2 of the electric wire due to the heat generation increases with a curve shown in FIG. 18(a) and reaches the saturation temperature T40max at the time point t1.

Thereafter, when the current is interrupted, since the temperature of the electric wire at this time is T40max, current I2 saturating at the electric-wire temperature T40max is calculated backwardly (state P3). As a result, the current I2 is obtained as 40 [A]. Then, the ambient temperature is inserted into T1 shown in the expression (2), and further the current I2 thus calculated and the lapsed time are also inserted into this expression to thereby obtain the estimation temperature T2 of the electric wire due to the heat dissipation (state P4).

In other words, when the current is interrupted after the current of 40 [A] flows into the electric wire and the temperature of this electric wire reaches the saturation temperature T40max of this current of 40 [A], 40 [A] is inserted into the current I2 shown in the right side of the expression (2) to thereby obtain the electric-wire temperature at the time of heat dissipation.

[Pattern 2]

FIG. 19(a) is a characteristic diagram showing the change of the temperature of the electric wire in a case where the temperature of the electric wire increases with the constant current (40 [A]) and the current is interrupted to thereby dissipate heat in a transient state before the electric wire temperature reaches the saturation temperature T40max. FIG. 19(b) is an explanatory diagram showing status changes.

When current of 40 [A] flows into the electric wire in a state where initial temperature is ambient temperature of T0 (state P11), the temperature of the electric wire increases gradually from the temperature T0 (state P12). Then, in a case where the current conduction of the current of 40 [A] is interrupted at a time point tx, that is, the current is interrupted at a transient temperature before the electric wire temperature reaches the saturation temperature T40max according to the current condition of 40 [A], temperature Tx due to the heat generation at this time is obtained and current I2 saturating at the temperature Tx as the saturation temperature is calculated backwardly (state P3). For example, when the electric wire temperature at the time point tx is the saturation temperature T30max in a case of flowing the current of 30 [A], 30 [A] is inserted into the current I2, further the ambient temperature is inserted into T1 and an elapsed time t is inserted in the right side of the expression (2) to thereby obtain the estimation temperature T2 of the electric wire due to the heat dissipation (state P14).

That is, when current of 40 [A] flows and then the current is interrupted before the temperature of the electric wire reaches the saturation temperature T40max of the current 40 [A], the current saturating at the temperature at the time of interrupting the current is obtained and the obtained current is inserted into the right side of the expression (2) to thereby obtain the electric wire temperature at the time of heat dissipation.

[Pattern 3]

FIG. 20(a) is a characteristic diagram showing the temperature change of the electric wire in a case where the temperature of the electric wire reaches the saturation temperature due to a first current (for example, 30 [A]) and further the temperature of the electric wire reaches the saturation temperature according to a second current (for example, 40 [A]) larger than the first current. FIG. 20(b) is an explanatory diagram showing status changes. When current of 30 [A] flows into the electric wire in a state where initial temperature is ambient temperature of T0 (state P21), the temperature Tx of the electric wire increases gradually from the temperature T0 (state P22) and then the temperature reaches the saturation temperature T30max at a time point t1 (state P23).

When the current is changed into 40 [A] in this state, a calculation is made backwardly as to a lapsed time t3 in a case of supposing that the current of 40 [A] flows from the beginning and the electric wire temperature reaches T30max (state P24). Then, 40 [A] is inserted into the current I1 and the time t3 is inserted into the time t in the right side of the expression (1) to thereby obtain estimation temperature T2 at a time point t2 (again, state P22). Then, when the time reaches the time point t2, the electric wire temperature reaches T40max of 40 [A] (state P25).

In other words, in the case where the current is changed into 40 [A] after the current of 30 [A] flows and the electric wire temperature reaches the saturation temperature T30max of 30 [A], the calculation is made as to the lapsed time, that is, a time t3 shown in FIG. 20(a) in the case of supposing that the current of 40 [A] flows from the beginning, and the time t3 is inserted into the expression (1) to thereby obtain the electric wire temperature.

[Pattern 4]

FIG. 21(a) is a characteristic diagram showing the temperature change of the electric wire in a case where the temperature of the electric wire increases due to a first current (for example, 30 [A]), then the current is changed into a second current (for example, 40 [A]) larger than the first current before the temperature reaches the saturation temperature T30max according to the first current and the temperature reaches the saturation temperature T40max according to the second current. FIG. 21(b) is an explanatory diagram showing status changes. When current of 30 [A] flows into the electric wire in a state where initial temperature is ambient temperature of T0 (state P32). Then, when the current is changed into 40 [A] at a time point tx where the electric wire temperature reaches Tx, a calculation is made backwardly as to a lapsed time t3 in a case of supposing that the current of 40 [A] flows from the beginning and the electric wire temperature reaches Tx (state P33). Then, 40 [A] is inserted into the current I1 and the time t3 is inserted into the time t in the right side of the expression (1) to thereby obtain an estimation temperature T2 at a time point t2 (again, state P32). Then, when the time reaches the time point t2, the electric wire temperature reaches T40max of 40 [A] (state P34).

In other words, in the case where the current is changed into 40 [A] after the current of 30 [A] flows and the electric wire temperature reaches the temperature Tx before reaching the saturation temperature of 30 [A], the calculation is made as to the lapsed time, that is, a time t3 shown in FIG. 21(a) in the case of supposing that the current of 40 [A] flows from the beginning, and the time t3 is inserted into the expression (1) to thereby obtain the electric wire temperature.

[Pattern 5]

FIG. 22(a) is a characteristic diagram showing the temperature change of the electric wire in a case where the temperature of the electric wire reaches the saturation temperature T40max of a first current due to the first current (for example, 40 [A]) and further the temperature of the electric wire reduces to the saturation temperature T30max of a second current according to the second current (for example, 30 [A]) smaller than the first current. FIG. 22(b) is an explanatory diagram showing status changes. When current of 40 [A] flows into the electric wire in a state where initial temperature is ambient temperature of T0 (state P41), the temperature Tx of the electric wire increases gradually from the temperature T0 (state P42) and then the temperature reaches the saturation temperature T40max at a time point t1 (state P43).

When the current is changed into 30 [A] in this state, a difference Δt (Δt=T40max−T30max) between the saturation temperature T40max of 40 [A] and the saturation temperature T30max of 30 [A] is obtained to thereby calculate current I2 saturating at this temperature Δt (state P44). As a result, if I2=7.5 [A], for example, 7.5 [A] is inserted into I2 in the right side of the expression (2) to thereby obtain estimation temperature T2 of the electric wire due to heat dissipation (state P45). Thereafter, when time t2 is elapsed, the electric wire temperature reaches the saturation temperature T30max in the case of flowing current of 30 [A] (state P46).

In other words, in the case where the current is changed into 30 [A] after the current of 40 [A] flows and then the electric wire temperature reaches the saturation temperature T40max of 40 [A], the difference Δt between the respective saturation temperatures is obtained, then the current I2 saturating at this difference temperature Δt is calculated, and the current I2 is inserted into the expression (2) to thereby obtain the electric wire temperature.

[Pattern 6]

FIG. 23(a) is a characteristic diagram showing the temperature change of the electric wire in a case where a first current is changed into a second current (for example, 30 [A]) smaller than the first current when the temperature of the electric wire increases according to the first current (for example, 40 [A]) and the temperature reaches Tx before reaching the saturation temperature T40max of the first current, then the electric wire temperature reduces and reaches the saturation temperature T30max of the second current. FIG. 23(b) is an explanatory diagram showing status changes.

When current of 40 [A] flows into the electric wire in a state where initial temperature is ambient temperature of T0 (state P51), the temperature Tx of the electric wire increases gradually from the temperature T0 (state P52).

Then, when the current is changed into 30 [A] at a time point tx where the electric wire temperature reaches Tx, a difference Δt (Δt=Tx−T30max) between the temperature Tx and the saturation temperature T30max in the case of flowing the current of 30 [A] is obtained to thereby calculate current I2 saturating at this temperature Δt (state P53). As a result, if I2=5 [A], for example, 5 [A] is inserted into I2 in the right side of the expression (2) to thereby obtain estimation temperature T2 of the electric wire due to heat dissipation (state P54). Thereafter, when time t2 is elapsed, the electric wire temperature reaches the saturation temperature T30max in the case of flowing current of 30 [A] (state P55).

In other words, in the case where the current is changed into 30 [A] at the time point where the current of 40 [A] flows and then the electric wire temperature reaches the temperature Tx before reaching the saturation temperature T40max of 40 [A], the differenceΔt between the temperature Tx and the saturation temperature T30max in the case of flowing the current of 30 [A] is calculated. Then, the current I2 saturating at this difference temperature Δt is calculated and the current I2 is inserted into the expression (2) to thereby obtain the electric wire temperature.

[Explanation of Operation of First Embodiment]

Figure 17:
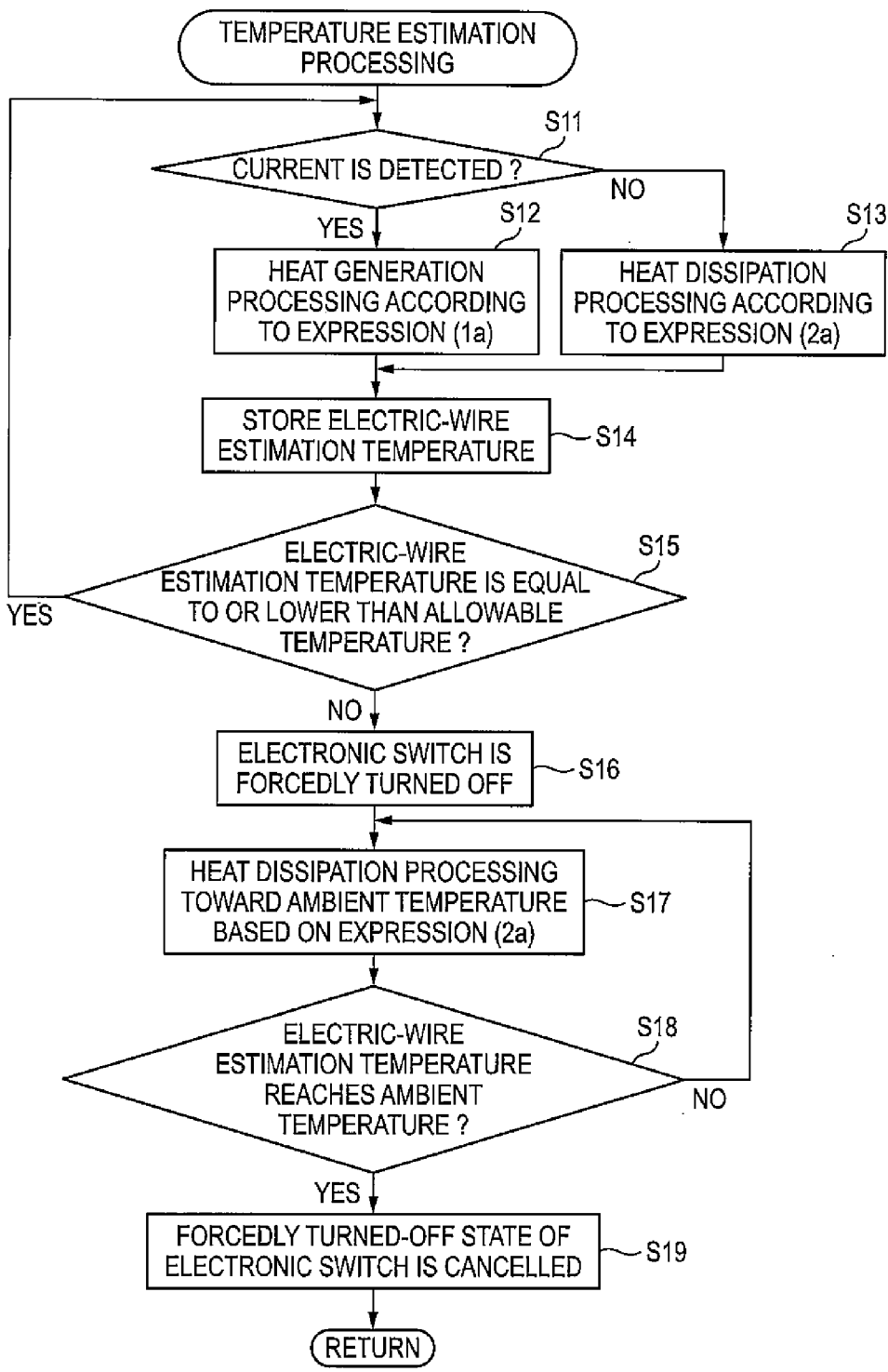
FIG. 17 is a flowchart showing the temperature estimation processing of the protection apparatus for a load circuit according to the first and second embodiments of the invention.
Figure 18:
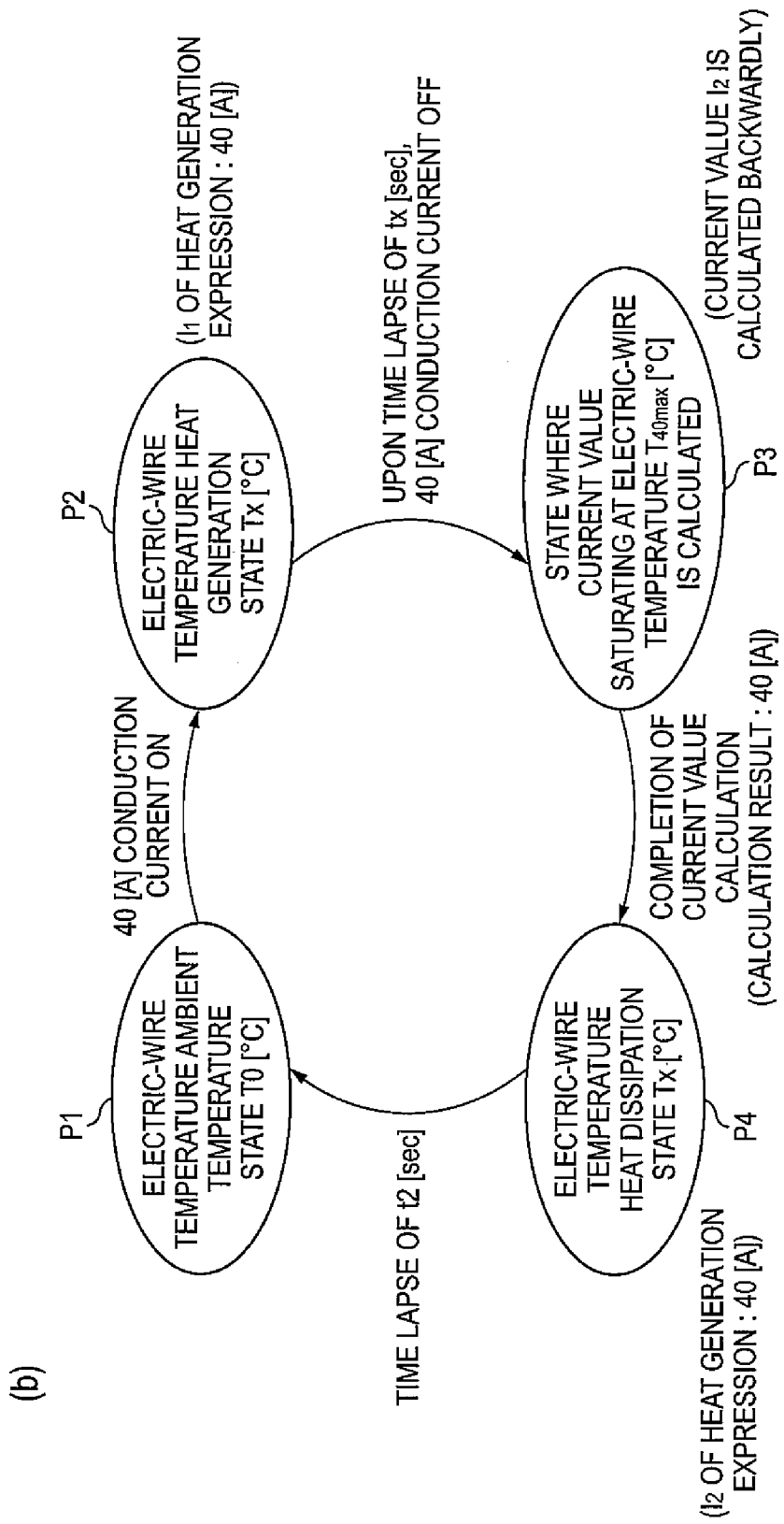
FIGS. 18(a) and (b) are explanatory diagrams showing a procedure of calculating the electric wire temperature due to heat generation and the electric wire temperature due to heat dissipation in the protection apparatus for a load circuit according to the embodiment of the invention.
FIG. 18(b) is an explanatory diagram showing status changes.
Figure 19:
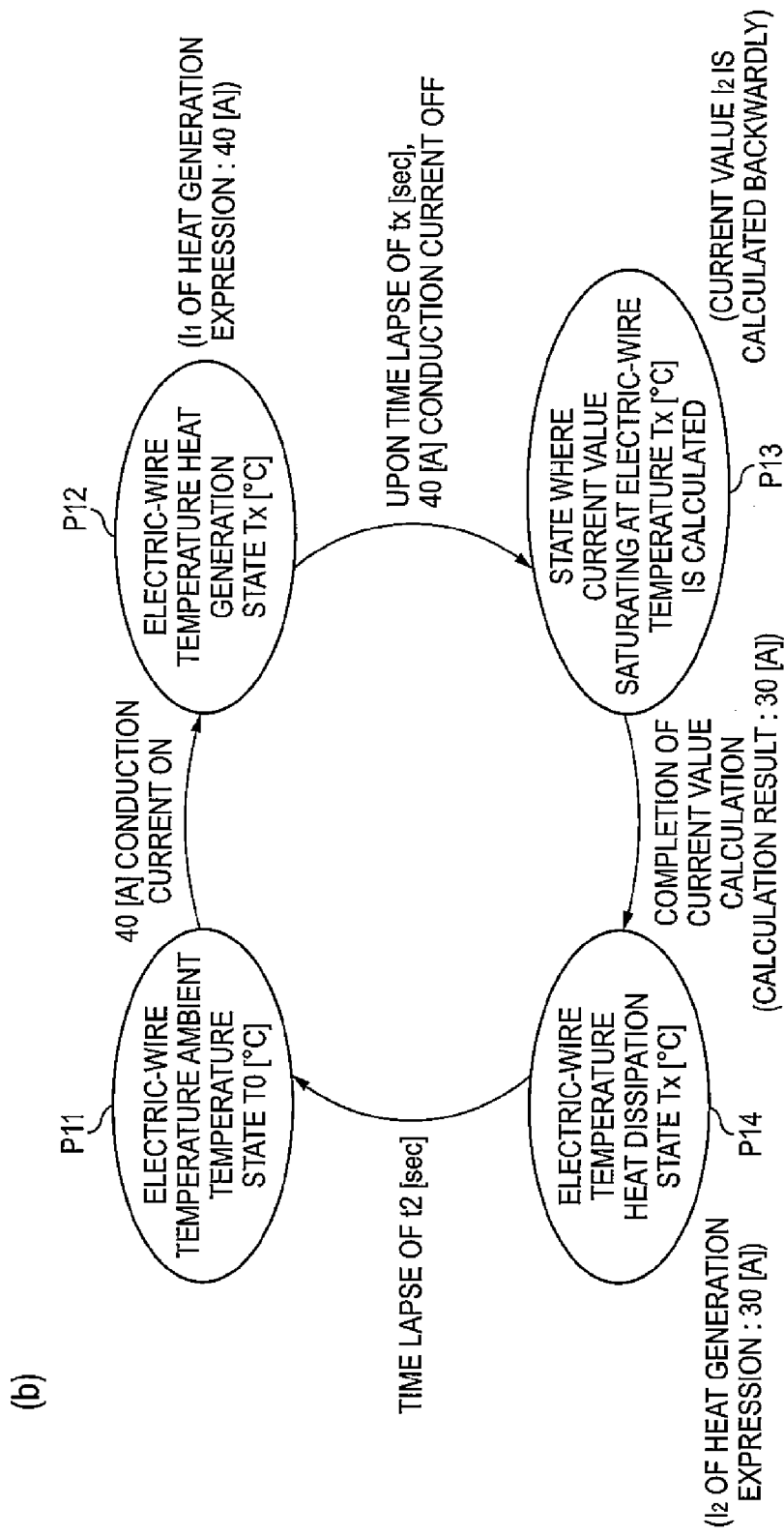
FIGS. 19(a) and (b) are explanatory diagrams showing a procedure of calculating the electric wire temperature due to heat generation and the electric wire temperature due to heat dissipation in the protection apparatus for a load circuit according to the embodiment of the invention.
Figure 20:
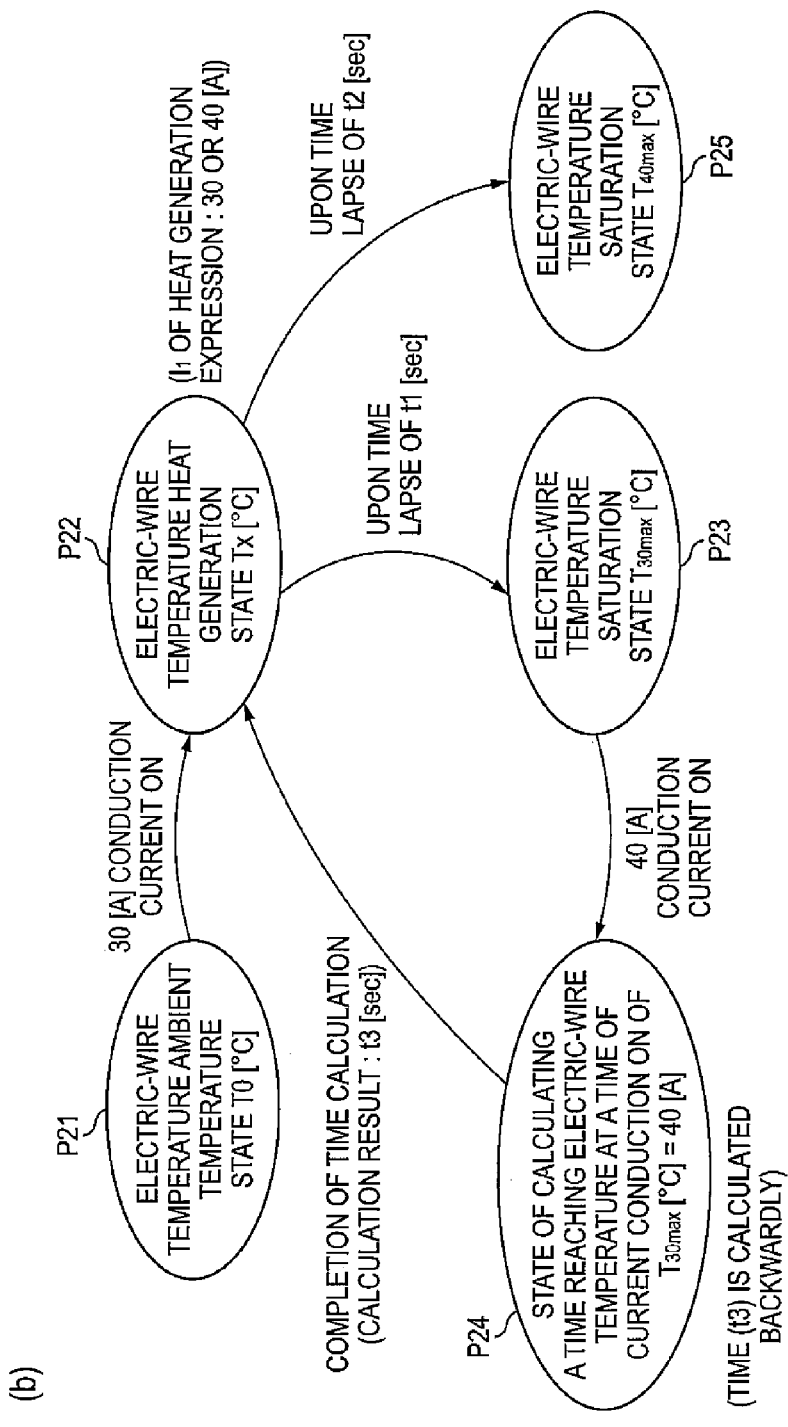
FIGS. 20(a) and (b) are explanatory diagrams showing a procedure of calculating the electric wire temperature due to heat generation and the electric wire temperature due to heat dissipation in the protection apparatus for a load circuit according to the embodiment of the invention.
FIG. 20(b) is an explanatory diagram showing status changes.
Figure 21:
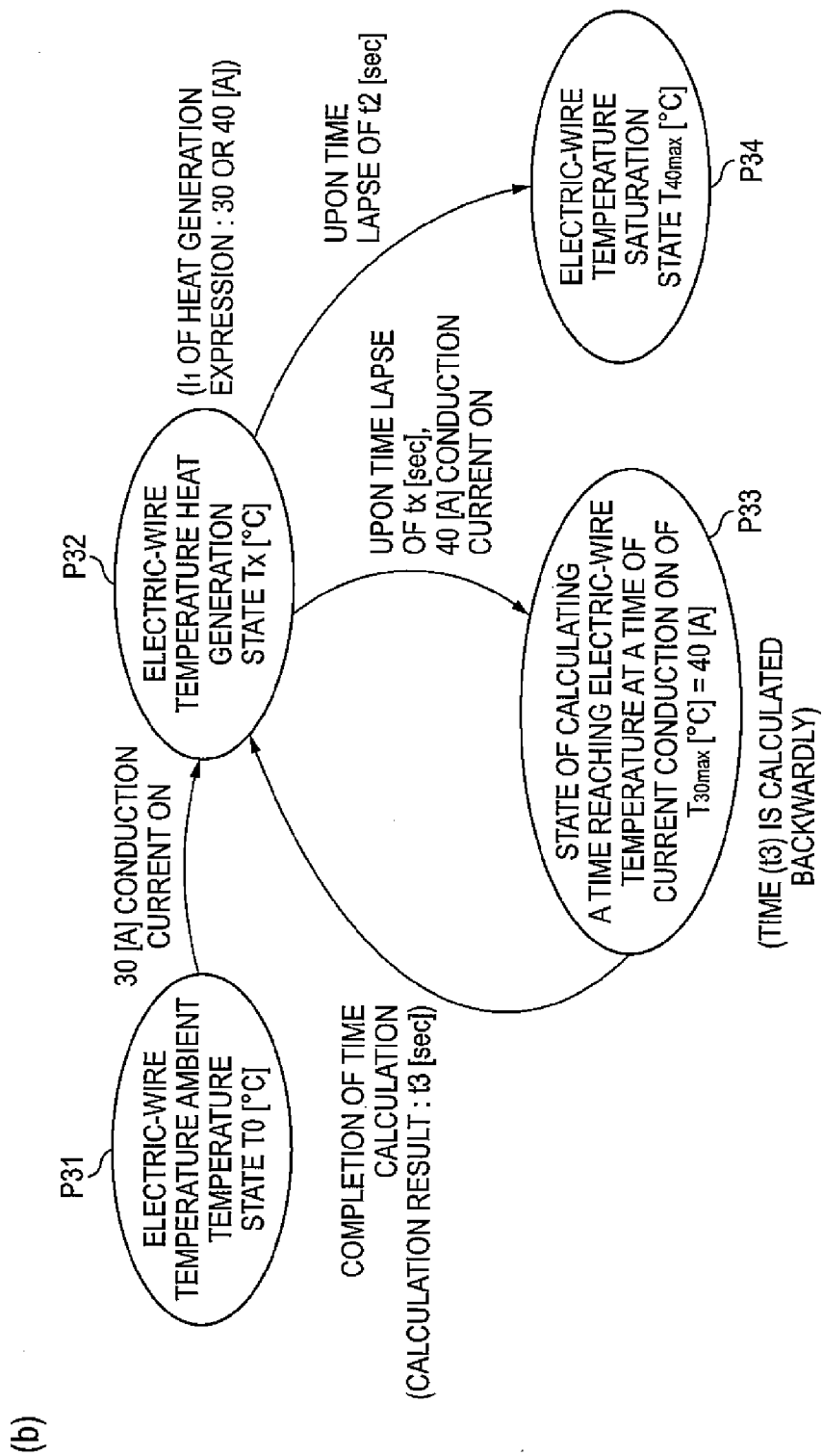
FIGS. 21(a) and (b) are explanatory diagrams showing a procedure of calculating the electric wire temperature due to heat generation and the electric wire temperature due to heat dissipation in the protection apparatus for a load circuit according to the embodiment of the invention.
FIG. 21(b) is an explanatory diagram showing status changes.
Figure 22:
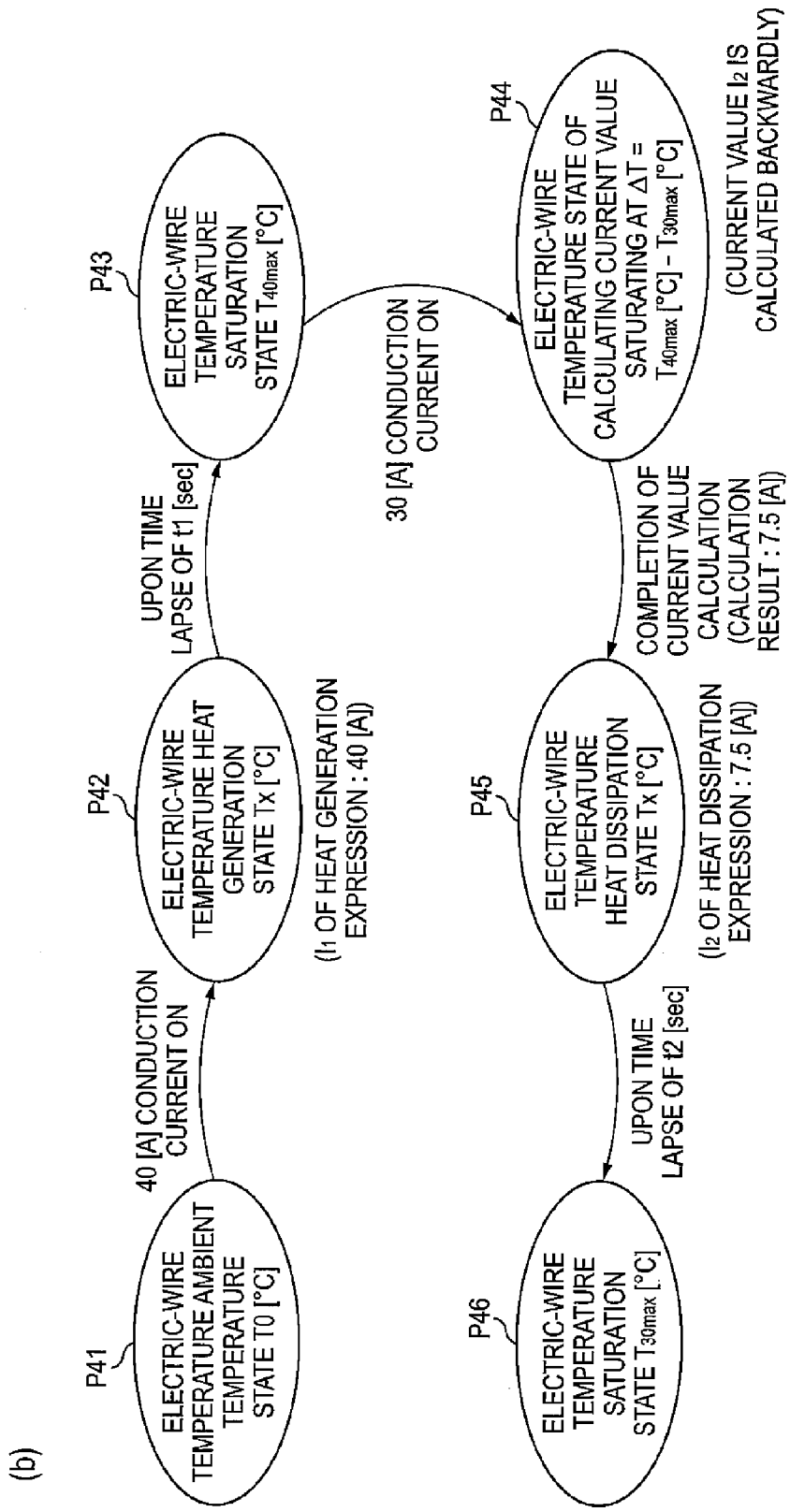
FIGS. 22(a) and (b) are explanatory diagrams showing a procedure of calculating the electric wire temperature due to heat generation and the electric wire temperature due to heat dissipation in the protection apparatus for a load circuit according to the embodiment of the invention.
FIG. 22(b) is an explanatory diagram showing status changes.
Figure 23:
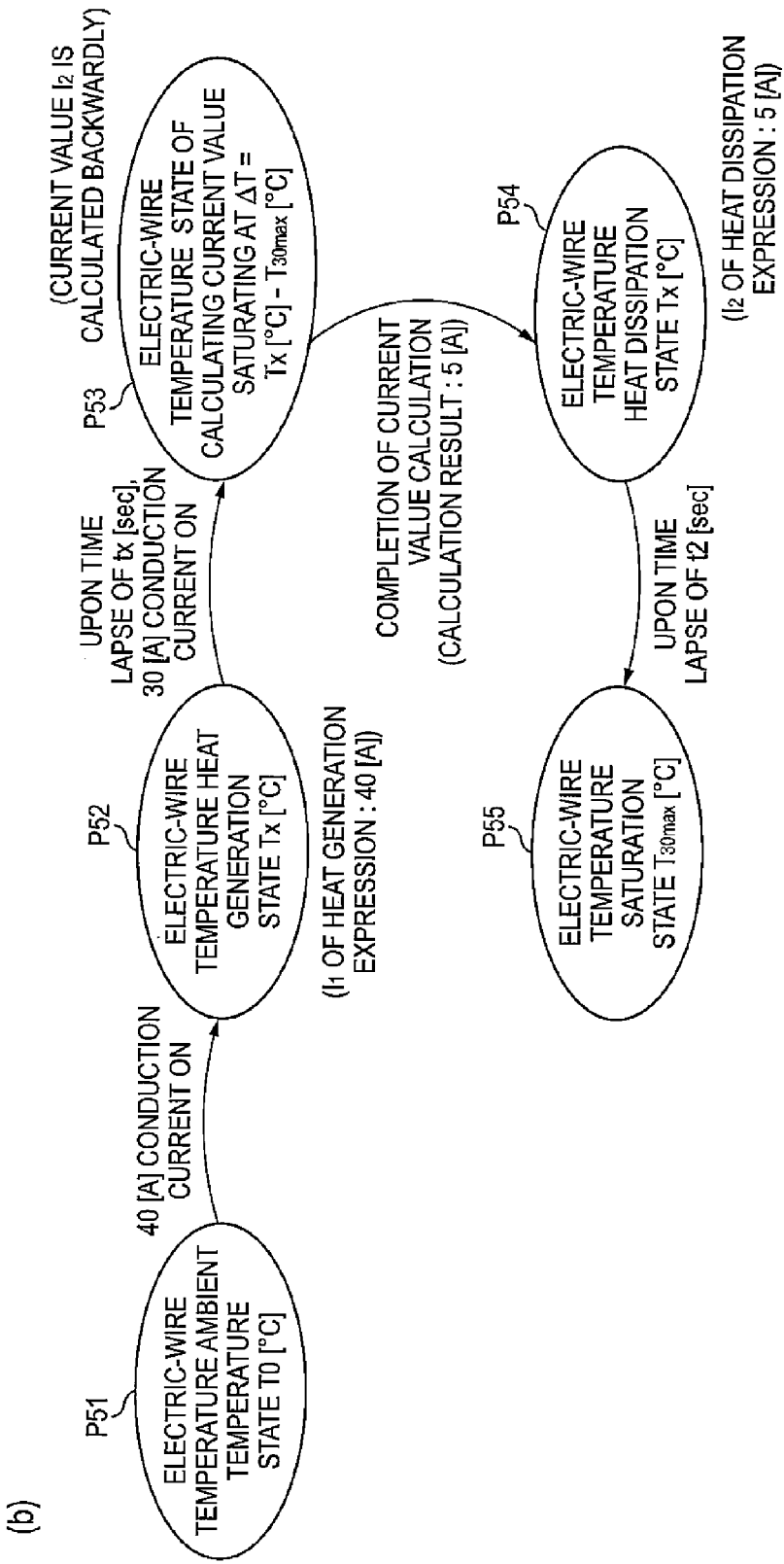
FIGS. 23(a) and (b) are explanatory diagrams showing a procedure of calculating the electric wire temperature due to heat generation and the electric wire temperature due to heat dissipation in the protection apparatus for a load circuit according to the embodiment of the invention.
FIG. 23(b) is an explanatory diagram showing status changes.
Figure 24:
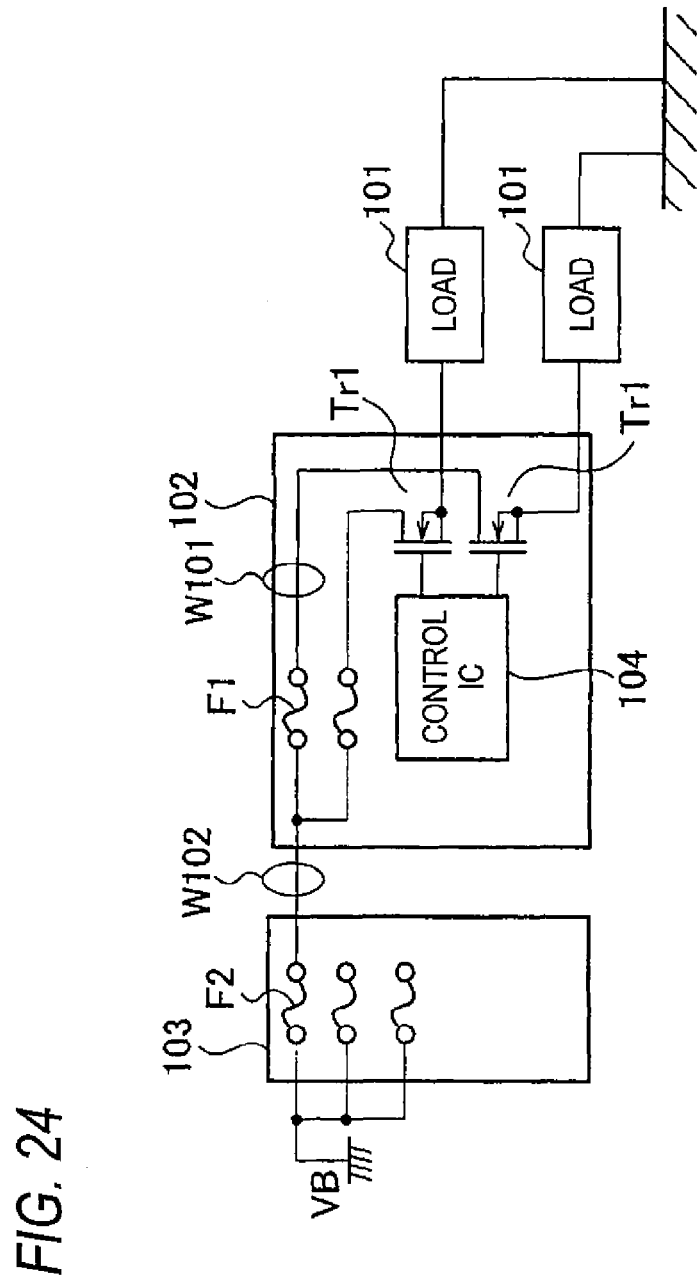
FIG. 24 is a circuit diagram showing the configuration of a protection apparatus for a load circuit of related art.

Next, the explanation will be made as to the processing operation of the protection apparatus for the load circuit according to the first embodiment with reference to a flowchart shown in FIG. 17. A series of processings shown in FIG. 17 is repeatedly executed with a predetermined sampling period.

First, the control circuit 161 of the switch circuit 16 shown in FIG. 2 determines whether or not current is detected by the ampere meter 163 (step S11). When the current is not detected (NO in step S11), the process proceeds to step S13. In step S13, the heat dissipation processing according to the expression (2a) is performed.

When the current is detected (YES in step S11), the control circuit 161 performs the heat generation processing according to the expression (1a) or the heat dissipation processing according to the expression (2a) based on the aforesaid patterns 1 to 6 (steps S12, S13).

In step S14, the control circuit 161 estimates the temperature of the electric wire at the current time based on the heat generation temperature or the heat dissipation temperature obtained in the step S12 or S13 and stores the estimation temperature in a memory (not shown) etc.

In step S15, the control circuit 161 determines whether or not the estimation temperature obtained in the processing of step S14 is equal to or lower than the allowable temperature. The allowable temperature is upper limit temperature at which the electric wires and the circuit configuration elements are durable and so the allowable temperature is set to the smoke emission temperature of the electric wire (150° C. as an example) or the temperature equal to or lower than the smoke emission temperature, for example.

When the control circuit 161 determines that the current estimation temperature is equal to or lower than the allowable temperature (YES in step S15), the process returns to step S11. On the other hand, when it is determined that the current estimation temperature exceeds the allowable temperature (NO in step S15), the electronic switch S1 (see FIG. 2) is forcedly turned off (step S16). In this case, the electronic switch S1 is not turned on even if the driving switch (not shown) of the electronic switch 51 is operated.

In step S17, the control circuit 161 performs the heat dissipation processing toward the ambient temperature based on the aforesaid expression (2a). That is, since current does not flow into the electric wire due to the turning-off of the electronic switch S1, the heat dissipation processing is performed toward the ambient temperature like the processing of step S14.

In step S18, the control circuit 161 determines whether or not the estimation temperature reaches the ambient temperature. When the estimation temperature does not reach the ambient temperature yet (NO in step S18), the processing returns to step S17. On the other hand, when the estimation temperature reaches the ambient temperature (YES in step S18), the forcedly turned-off state of the electronic switch S1 is cancelled (step S19).

That is, when the estimation temperature reaches the ambient temperature, since there is no problem even if current is flown into the load circuit again, the forcedly turned-off state of the electronic switch S1 is cancelled. Thus, when the power supply to the load 11 is made possible by turning the electronic switch S1 on and further the semiconductor switch Tr1 is turned on, current can be flown into the load circuit. Thereafter, the processing returns to step S11. In this manner, the estimation processing of the electric-wire temperature is performed.

As described above, in the protection apparatus for the load circuit according to the first embodiment, the conductor resistance r and the heat resistance R used in the temperature calculation expression according to the heat generation shown in the expression (1) and the temperature calculation expression according to the heat dissipation shown in the expression (2) are changed into the pseudo conductor resistance r* and the pseudo heat resistance R*, respectively. That is, the pseudo conductor resistance r* larger than the actual conductor resistance r and the pseudo heat resistance R* smaller than the actual heat resistance R are set to thereby obtain the aforesaid expressions (1a) and (2a) based on these resistances thus set.

The temperature of the electric wire W1 is estimated by using these expressions (1a) and (2a). Then, when the estimation temperature reaches the allowable temperature (for example, 150° C.) of the electric wire, the electronic switch S1 is turned off to thereby protect the load circuit. Thus, at the time point before the actual temperature of the electric wire W1 reaches the allowable temperature (for example, 150° C.) after over-current flows into the load 11, the circuit can be surely turned off to thereby protect the electric wire W1 and the load 11 provided on the downstream side thereof. Therefore, it is not necessary to use the fuse of the related art.

Further, unlike the related art, since there is no fear that the fuse degrades due to the rush current and the repetition of the turning on/off operations of the load, it is not necessary to consider margin with respect to the allowable temperature, so that the diameter of the electric wire can be made small. Thus, since the electric wires can be miniaturized and light-weighted, the fuel cost can be improved.

Further, predetermined current values such as 5 [A], 7.5 [A], 10 [A], 15 [A], 20 [A] - - - are set in the fuses of the related art. However, in the protection apparatus for the load circuit according to this embodiment, an arbitrary current value (for example, 6 [A], 12.5 [A] etc.) can be set by suitably setting the pseudo conductor resistance r* and the pseudo heat resistance R*, which contributes to the reduction of the diameter of the electric wire.

Further, since the temperature estimation method is employed, the embodiment can be applied not only to a load circuit configured to have one fuse for one load but also to a system in which a plurality of loads brunched on the downstream side are connected and to a load circuit in which loads are turned on/off at random timings.

[Explanation of Second Embodiment]

Next, the explanation will be mad e as to a second embodiment. The aforesaid first embodiment is explained as to the example where the conductor resistance r and the heat resistance R shown in the expressions (1) and (2) are changed into the actual conductor resistance r and the pseudo heat resistance R*, respectively. In the second embodiment, the heat resistance R shown in the expressions (1) and (2) is changed into the pseudo heat resistance R* and the allowable temperature of the electric wire is set to pseudo allowable temperature lower than the actual allowable temperature to thereby obtain temperature characteristics simulating a fuse. Hereinafter, a temperature calculation method used in the second embodiment will be explained.

[Temperature Calculation Using Pseudo Conductor Resistance]

In the aforesaid expressions (1) and (2), when the allowable temperature of the electric wire is changed into a value lower than the actual value (for example, 150° C.), a time required for the estimation temperature T2 to reach the allowable temperature becomes shorter. The explanation will be made in detail.

Figure 7:
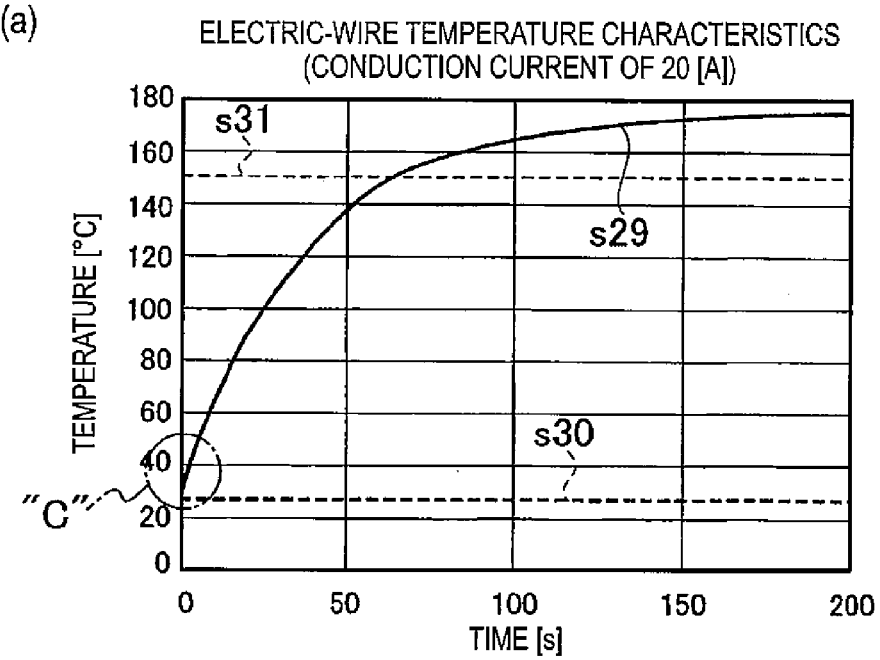
FIG. 7(a) relates to the protection apparatus for a load circuit according to the second embodiment of the invention and is an explanatory diagram showing the characteristics of electric-wire temperature in a case where allowable temperature of the electric wire is changed and current of 20 [A] is flown.
FIG. 7(b) is an enlarged diagram of a portion "C" shown in FIG. 7(a).
Figure 7:
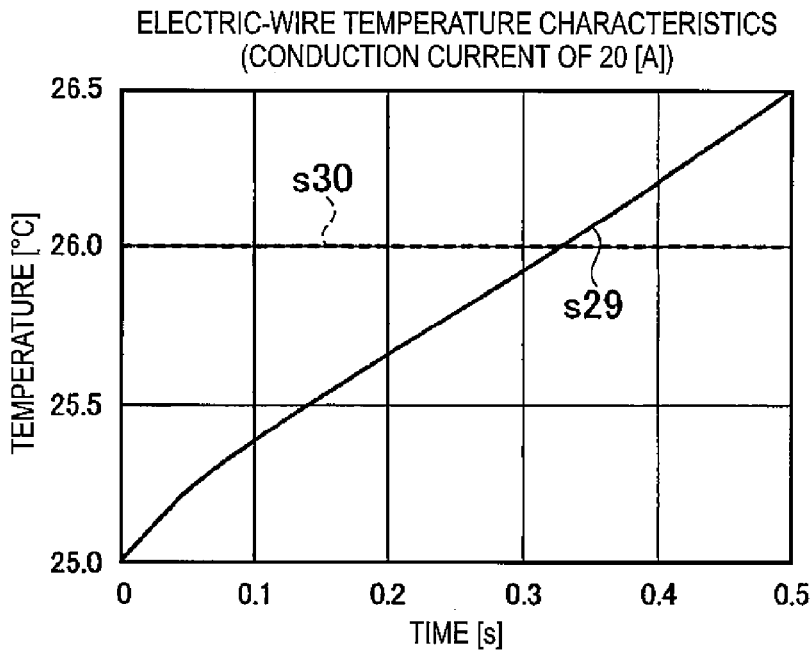

FIG. 7 is a characteristic diagram showing the change of the temperature of the electric wire in a case where the electric wire with the allowable temperature of 150° C. (hereinafter called a sample electric wire) is used and current of 20 [A] (small over-current) is flown continuously into the sample electric wire, in which (b) is an enlarged diagram of a portion "C" shown in (a). Further, a curve s29 shown in FIG. 7 is a characteristic diagram showing the change of the electric-wire temperature with respect to time lapse. A curve s30 is a line showing the electric-wire temperature of 26° C. and a curve s31 is a line showing the electric-wire temperature of 150° C.

As shown in FIG. 7(b), when current of 20 [A] is flown continuously into the electric wire under the environment of the ambient temperature of 25° C., the electric-wire temperature reaches 26° C. with a time lapse of 0.33 [sec]. That is, the curve s29 crosses with the curve s30. Further, as shown in FIG. 7(a), when current of 20 [A] is flown continuously into the electric wire under the environment of the ambient temperature of 25° C., the electric-wire temperature reaches 150° C. with a time lapse of 68 [sec]. That is, the curve s29 crosses with the curve s31. Thus, the time required for the estimation temperature T2 of the electric wire to reach the allowable temperature can be made shorter by changing the allowable temperature of the electric wire into a low value.

Figure 8:
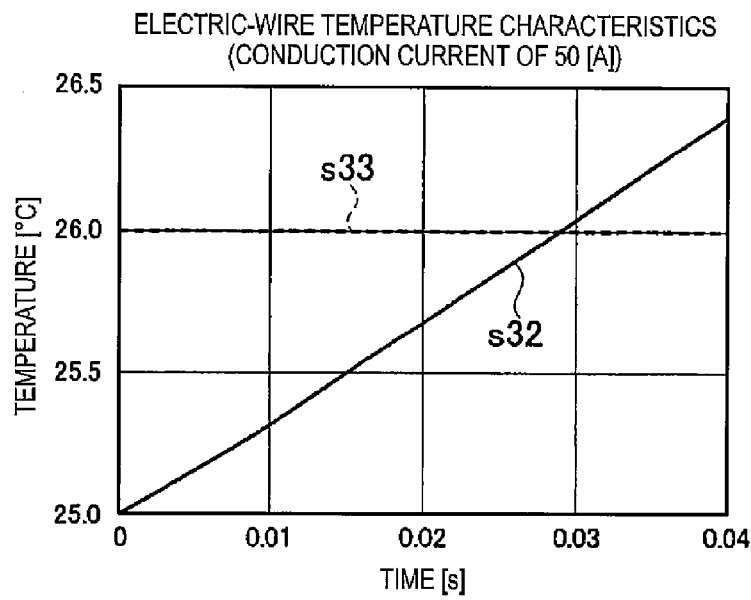
FIG. 8(a) relates to the protection apparatus for a load circuit according to the second embodiment of the invention and is an explanatory diagram showing the characteristics of electric-wire temperature in a case where allowable temperature of the electric wire is changed and current of 50 [A] is flown.
FIG. 8(b) is an enlarged diagram of a portion "D" shown in (a) and (c) is an enlarged diagram of a portion "E" shown in FIG. 8(a).

FIG. 8 is a characteristic diagram showing the change of the temperature of the electric wire in a case where current of 50 [A] (large over-current) is flown continuously into the sample electric wire, in which (b) is an enlarged diagram of a portion "D" shown in (a) and (c) is an enlarged diagram of a portion "E" shown in (a). Further, a curve s32 shown in FIG. 8 is a characteristic diagram showing the change of the electric-wire temperature with respect to time lapse. A curve s33 is a line showing the electric-wire temperature of 26° C. and a curve s34 is a line showing the electric-wire temperature of 150° C.

As shown in FIG. 8(c), when current of 50 [A] is flown continuously into the electric wire under the environment of the ambient temperature of 25° C., the electric-wire temperature reaches 26° C. with a time lapse of 0.028 [sec]. That is, the curve s32 crosses with the curve s33. Further, as shown in FIG. 8(b), when current of 50 [A] is flown continuously into the electric wire under the environment of the ambient temperature of 25° C., the electric-wire temperature reaches 150° C. with a time lapse of 5.5 [sec]. That is, the curve s32 crosses with the curve s34. Thus, like the aforesaid case of 20 [A], the time required for the estimation temperature T2 of the electric wire to reach the allowable temperature can be made shorter by changing the allowable temperature of the electric wire into a low value.

[Temperature Calculation Method Using Pseudo Heat Resistance R*]

Further, as explained above with reference to FIGS. 5 and 6, in the case of flowing the current of 20 [A], 50 [A] continuously into the sample electric wire, the saturation temperature can be reduced by using the pseudo heat resistance R*.

Summarizing the aforesaid contents, the time required for the estimation temperature T2 of the electric wire to reach the allowable temperature can be made shorter by changing the allowable temperature of the electric wire into the pseudo allowable temperature (for example, 26° C.) set so as to be lower than the actual allowable temperature (for example, 150° C.). Further, the saturation temperature of the electric wire can be reduced by changing the heat resistance R used in the aforesaid expressions (1) and (2) into the pseudo heat resistance R*.

In this embodiment, the allowable temperature of the electric wire is set to the pseudo allowable temperature lower than the actual allowable temperature and the following expressions (1b) and (2b) are set in which the heat resistance R used in the expressions (1) and (2) is changed into the pseudo heat resistance R*.

$$T2 = T1 + I1^2 \cdot r \cdot (R^*) \cdot \{1 - \exp(-t/C \cdot R)\} \tag{1b}$$

$$T2 = T1 + I2^2 \cdot r \cdot (R^*) \cdot \{\exp(-t/C \cdot R)\} \tag{2b}$$

(allowable temperature of electric wire=26° C., R*=0.3 [° C./W])

When the estimation temperature of the electric wire obtained by using the expressions (1b) and (2b) reaches the pseudo allowable temperature, the electronic switch S1 is turned off to thereby protect the circuit.

Hereinafter, the explanation will be made as to the procedure of setting the expressions (1b) and (2b).

Figure 14:
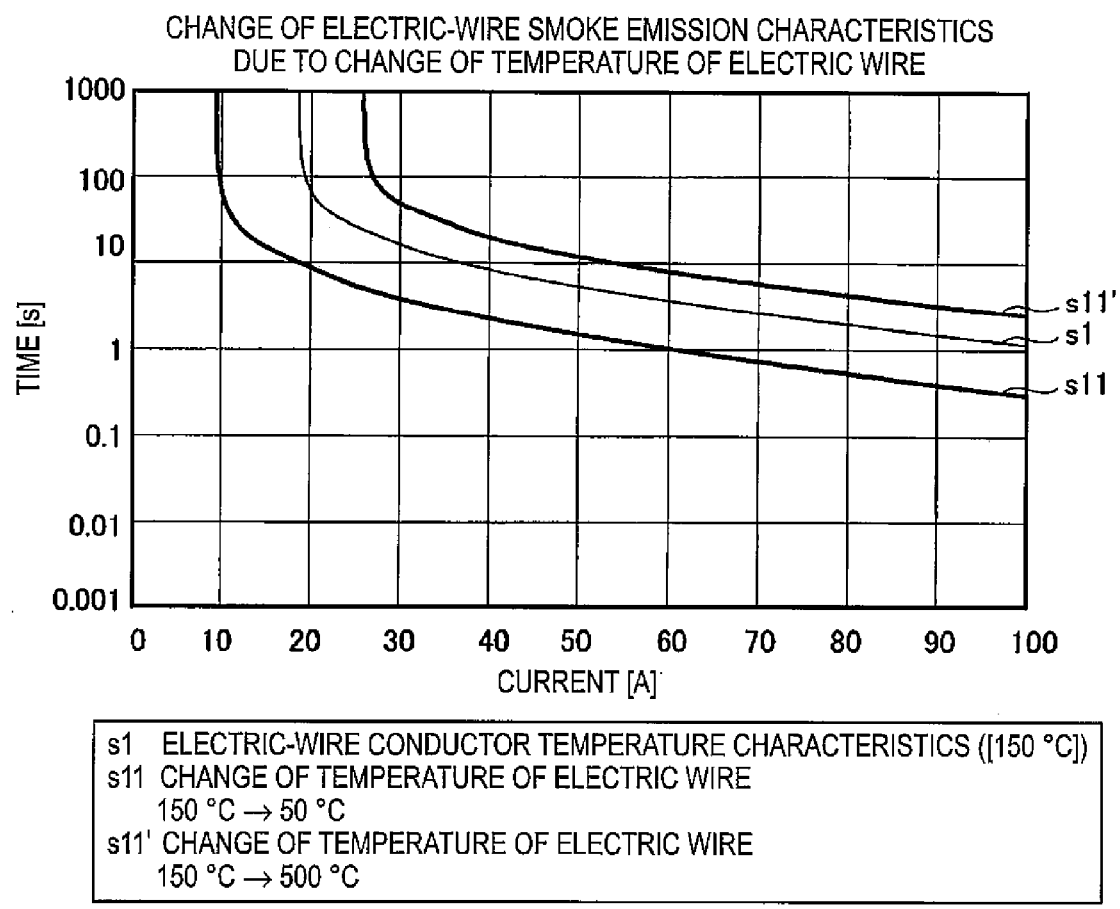
FIG. 14 is an explanatory diagram showing current interruption time characteristics of the protection apparatus for a load circuit according to the second embodiment of the invention.

A curve s1 shown in FIG. 14 is a characteristic diagram showing current interruption time characteristics at the time of setting the allowable temperature to 150° C. That is, the curve s1 represents the relation between the current I1 and the lapsed time t [sec] of the right side of the expression (1) when T2 of the left side of this expression is fixed to 150° C.

Further, a curve s11 is a characteristic diagram showing current interruption time characteristics at the time of setting the allowable temperature to the pseudo allowable temperature (50° C.), and a curve s11' is a characteristic diagram showing current interruption time characteristics at the time of setting the allowable temperature to the pseudo allowable temperature (500° C.). As will be understood from the respective curves s1, s11 and s11', the respective curves shift to the left lower side when the pseudo allowable temperature is changed into a value lower than the actual allowable temperature, whilst the respective curves shift to the right upper side when the pseudo allowable temperature is changed into a value higher than the actual allowable temperature.

Figure 15:
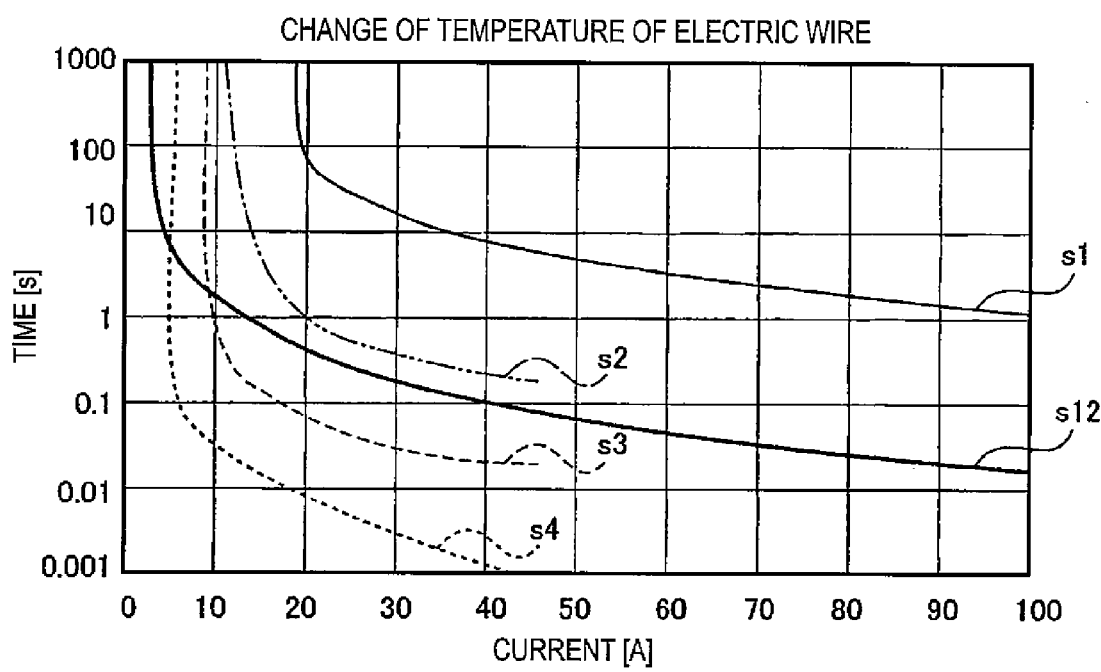
FIG. 15 is an explanatory diagram showing current interruption time characteristics of the protection apparatus for a load circuit according to the second embodiment of the invention.

A curve s12 shown in FIG. 15 is obtained when the pseudo allowable temperature is set to 26° C. with respect to the curve s1 shown in FIG. 9 (allowable temperature: 150° C.).

As shown in FIG. 15, in a region where the current exceeds 10 [A], the curve s12 has characteristics existing between the curve s2 and the curve s3. However, in a region where the current is equal to or lower than 10 [A], this curve shifts largely to the left side than the curve s3 and further shifts to the left side than the load characteristics curve s4. This unit that the load circuit is interrupted when normal current flows into the load.

Further, as shown in FIG. 12, the value of the left end of the current interruption time characteristic curve shifts to the right side in FIG. 12 when the pseudo heat resistance R* smaller than the actual heat resistance R is used, whilst the value of the left end of the current interruption time characteristic curve shifts to the left side in FIG. 12 when the pseudo heat resistance R* larger than the actual heat resistance R is used.

Figure 16:
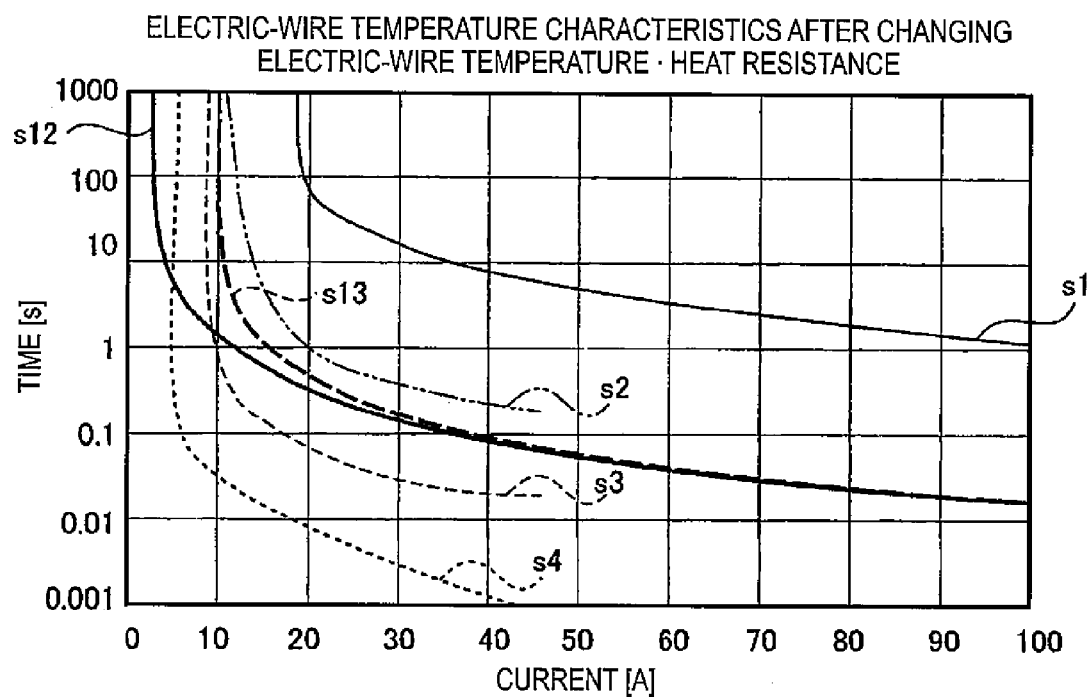
FIG. 16 is an explanatory diagram showing current interruption time characteristics of the protection apparatus for a load circuit according to the second embodiment of the invention.

Thus, when the pseudo allowable temperature is set to 26° C. and the pseudo heat resistance R* is set to 0.3 [° C./W] (that is, R*<R=7.53 [° C./W]), a characteristic curve can be obtained as shown by the characteristic curve s13 of FIG. 16 in which the minimum current of the characteristic curve s12 is shifted to the right side. Since the characteristic curve s13 has the characteristics between the characteristic curve s2 and the characteristic curve s3, this characteristic curve has the current interruption time characteristics simulating the fuse.

In view of the aforesaid matter, the allowable temperature of the electric wire is changed into the pseudo allowable temperature of 26° C. from the actual allowable temperature of 150° C., the aforesaid expressions (1b) and (2b) are set in a manner that the heat resistance R used in the expressions (1) and (2) is changed into the pseudo heat resistance R* (for example, R*=0.3 [° C./W]), and the temperature of the electric wire is estimated by using these expressions (1b) and (2b). Then, the characteristics almost same as that of the fuse of the related art can be obtained if the electronic switch S1 (see FIG. 2) is turned off at a time where the estimated temperature of the electric wire reaches the pseudo allowable temperature (26° C.). Of course, the estimation temperature in this case is not the actual temperature of the electric wire but a pseudo temperature determined by the aforesaid temperature calculation method.

[Explanation of Operation of Second Embodiment]

The procedure of the temperature estimation processing according to the second embodiment is same as the procedure shown in FIG. 17 only except for that the expressions (1a) and (2a) described in the flowchart shown in FIG. 17 are changed into the expressions (1b) and (2b) respectively, and hence the explanation thereof will be omitted.

In this manner, in the protection apparatus for the load circuit according to the second embodiment, the allowable temperature of the electric wire is changed into 26° C., and the heat resistance R used in each of the temperature calculation expression according to the heat generation shown in the expression (1) and the temperature calculation expression according to the heat dissipation shown in the expression (2) is changed into the pseudo heat resistance R* to thereby obtain the expressions (1b) and (2b).

Then, the temperature of the electric wire W1 is estimated by using these expressions (1b) and (2b). When the estimation temperature reaches the pseudo allowable temperature (for example, 26° C.), the electronic switch S1 is turned off to thereby protect the load circuit. Thus, at the time point before the temperature of the electric wire W1 reaches the actual allowable temperature (for example, 150° C.) after over-current flows into the load 11, the circuit can be surely interrupted to thereby protect the electric wire W1 and the load 11 provided on the downstream side of the electric wire. Thus, it is not necessary to use the fuse of the related art.

Further, unlike the related art, since there is no fear that the fuse degrades due to the rush current and the repetition of the turning on/off operations of the load, it is not necessary to consider margin with respect to the allowable temperature, so that the diameter of the electric wire can be made small. Thus, since the electric wires can be miniaturized and light-weighted, the fuel cost can be improved.

Further, predetermined current values such as 5 [A], 7.5 [A], 10 [A], 15 [A], 20 [A] - - - are set in the fuses of the related art. However, in the protection apparatus for the load circuit according to the second embodiment, an arbitrary current value (for example, 6 [A], 12.5 [A] etc.) can be set by suitably setting the pseudo conductor resistance and the pseudo heat resistance R*, which contributes to the reduction of the diameter of the electric wire.

Further, since the temperature estimation method is employed, the embodiment can be applied not only to a load circuit configured to have one fuse for one load but also to a system in which a plurality of loads brunched on the downstream side are connected and to a load circuit in which loads are turned on/off at random timings.

As described above, although the protection apparatus for the load circuit according to the invention is explained based on the embodiments shown in the drawings, the invention is not limited thereto and each of the respective constituent elements thereof can be replaced by an arbitrary constituent element having similar function. For example, although these embodiments are explained as to the case of the load circuit mounted on a vehicle as an example, the invention is not limited thereto and the invention can be applied to other load circuits.

Although the invention has been explained in detail with reference to the particular embodiments, it will be apparent for those skilled in the art that various changes and modifications can be made without departing from the spirits and range of this invention.

The present application is based on Japanese Patent Application (Japanese Patent Application No. 2009-134793) filed on Jun. 4, 2009, the contents of which is incorporated herein by reference.

Industrial Applicability

This invention is quite useful in a view point of protecting the electric wires and the semiconductor switches used in the load circuit without using fuses.

Explanation of Symbols 11 load
12 ECU
13 J/B (junction box)
14 control IC
15 control unit
16 switch circuit
161 control circuit (temperature estimation unit, over-current determination unit, interruption control unit)
162 timer
163 ampere meter (current detection unit)
VB battery
S1 electronic switch (switch unit)
Tr1 semiconductor switch

The invention claimed is:

1. A protection apparatus for a load circuit in which current flowing into an electric wire is detected to thereby turn a semiconductor switch off based on the detected current in the load circuit wherein a power supply, the semiconductor switch and a load are connected via the electric wire, comprising:
a switch unit which is provided between the power supply and the load;

a current detection unit which detects current flowing into the electric wire;

a temperature calculation unit which is provided with a pseudo heat generation temperature calculation expression and a pseudo heat dissipation temperature calculation expression, in which a conductor resistance (r) used in a calculation expression for calculating heat generation amount and heat dissipation amount of the electric wire is changed into a non-actual pseudo conductor resistance (r*) which has a value simulating current interruption time characteristics of a fuse instead of the conductor resistance (r) and which is capable of being used to protect the electric wire used in the load circuit, and in which a heat resistance (R) used in the calculation expression is changed into a non-actual pseudo heat resistance (R*) which has a value simulating the current interruption time characteristics of the fuse instead of the heat resistance (R) is set, the temperature calculation unit estimating temperature of the electric wire by using the pseudo heat generation temperature calculation expression, the pseudo heat dissipation temperature calculation expression and the current detected by the current detection unit;

an over-current determination unit which determines to be over-current when the estimation temperature calculated by the temperature calculation unit reaches allowable temperature; and an interruption control unit which interrupts the switch unit when the over-current determination unit determines to be over-current.

2. The protection apparatus for a load circuit according to claim 1, wherein the interruption control unit places the switch unit in a connectable state when the temperature of the electric wire estimated by the temperature calculation unit reduces to ambient temperature after interrupting the switch unit.

3. The protection apparatus for a load circuit according to claim 1, wherein the pseudo conductor resistance (r*) and the pseudo heat resistance (R*) are set so that the current interruption time characteristics based on the pseudo heat generation temperature calculation expression and the pseudo heat dissipation temperature calculation expression exists between minimum of the current interruption time characteristics of the fuse and maximum of the current interruption time characteristics of the fuse.

4. The protection apparatus for a load circuit according to claim 1, wherein the calculation expression for calculating heat generation amount of the electric wire is represented by a following expression (1) and the calculation expression for calculating heat dissipation amount of the electric wire is represented by a following expression (2), where $$T2 = T1 + I1^2 rR\{1 - \exp(-t/C \cdot R)\} \quad (1)$$

$$T2 = T1 + I2^2 rR\{\exp(-t/C \cdot R)\} \quad (2),$$

and where T1 represents the ambient temperature [° C.], T2 represents the estimation temperature [° C.] of the electric wire, I1 and I2 each represents a conduction current [A], r represents a conductor resistance [Ω] of the electric wire, R represents a heat resistance [° C./W], C represents a heat capacity [J/° C.] and t represents a time [sec].

5. The protection apparatus for a load circuit according to one of claim 1, wherein the pseudo conductor resistance (r*) is larger than the conductor resistance (r) of the electric wire and the pseudo heat resistance (R*) is smaller than the heat resistance (R) of the electric wire.

6. A protection apparatus for a load circuit in which current flowing into an electric wire is detected to thereby turn a semiconductor switch off based on the detected current in the load circuit wherein a power supply, the semiconductor switch and a load are connected via the electric wire, comprising:

a switch unit which is provided between the power supply and the load;

a current detection unit which detects current flowing into the electric wire;

a temperature calculation unit which is provided with a pseudo heat generation temperature calculation expression and a pseudo heat dissipation temperature calculation expression in which allowable temperature of the electric wire is set to non-actual pseudo allowable temperature lower than an actual allowable temperature and in which a heat resistance (R) used in a calculation expression for calculating heat generation amount and heat dissipation amount of the electric wire is changed into a non-actual pseudo heat resistance (R*) instead of the heat resistance (R) which has a value simulating the current interruption time characteristics of the fuse and is capable of being used to protect the electric wire used in the load circuit, the temperature calculation unit estimating temperature of the electric wire by using the pseudo heat generation temperature calculation expression, the pseudo heat dissipation temperature calculation expression and the current detected by the current detection unit;

an over-current determination unit which determines to be over-current when the estimation temperature calculated by the temperature calculation unit reaches the pseudo allowable temperature; and an interruption control unit which interrupts the switch unit when the over-current determination unit determines to be over-current.

7. The protection apparatus for a load circuit according to claim 6, wherein the interruption control unit places the switch unit in a connectable state when the temperature of the electric wire estimated by the temperature calculation unit reduces to ambient temperature after interrupting the switch unit.

8. The protection apparatus for a load circuit according to claim 6, wherein the pseudo allowable temperature and the pseudo heat resistance (R*) are set so that the current interruption time characteristics based on the pseudo heat generation temperature calculation expression and the pseudo heat dissipation temperature calculation expression exists between minimum of the current interruption time characteristics of the fuse and maximum of the current interruption time characteristics of the fuse.

9. The protection apparatus for a load circuit according to claim 6, wherein the calculation expression for calculating heat generation amount of the electric wire is represented by a following expression (1) and the calculation expression for calculating heat dissipation amount of the electric wire is represented by a following expression (2), where $$T2 = T1 + I1^2 rR\{1 - \exp(-t/C \cdot R)\} \quad (1)$$

$$T2 = T1 + I2^2 rR\{\exp(-t/C \cdot R)\} \quad (2),$$

and where T1 represents the ambient temperature [° C.], T2 represents the estimation temperature [° C.] of the electric wire, I1 and I2 each represents a conduction current [A], r represents a conductor resistance [Ω] of the electric wire, R represents a heat resistance [° C./W], C represents a heat capacity [J/° C.] and t represents a time [sec].

10. The protection apparatus for a load circuit according to claim 6, wherein the pseudo heat resistance (R*) is smaller than the heat resistance (R) of the electric wire.

* * * * *